United States Patent [19]

Warren et al.

[11] Patent Number: 5,065,258

[45] Date of Patent: Nov. 12, 1991

[54] TRANSMITTING INFORMATION FROM PRODUCER TO END USERS THROUGH SLANT-TRACK TAPE-TO-TAPE COPYING AT HIGHER-THAN-STANDARD SIGNAL TRANSMISSION

[75] Inventors: Eugene D. Warren, Long Beach; Robert B. Pfannkuch, Manhattan Beach; William C. Laumeister, San Jose; Louis L. Pourciau, Portola Valley, all of Calif.

[73] Assignee: Rank Video Services America, Northbrook, Ill.

[21] Appl. No.: 248,401

[22] Filed: Sep. 23, 1988

Related U.S. Application Data

[63] Continuation-in-part of Ser. No. 906,822, Sep. 12, 1986, abandoned.

[51] Int. Cl.$^5$ .............................................. G11B 5/86
[52] U.S. Cl. ...................................................... 360/15
[58] Field of Search ............... 360/8, 15, 9.1, 10.3, 360/33.1, 37.1; 358/86, 335, 134; 455/3

[56] References Cited

U.S. PATENT DOCUMENTS

| | | |
|---|---|---|
| 1,116,949 | 11/1914 | Stille . |
| 3,027,425 | 3/1962 | Tannenbaum et al. . |
| 3,564,141 | 2/1971 | Hurst . |
| 3,592,977 | 7/1971 | Lemke . |
| 3,714,377 | 1/1973 | Moretti . |
| 3,781,479 | 12/1973 | Swoboda . |
| 3,893,169 | 7/1975 | Hall, Jr. . |
| 4,108,365 | 8/1978 | Hughes . |
| 4,167,023 | 9/1979 | Bessette et al. ................. 360/70 |
| 4,355,338 | 10/1982 | Yamamoto et al. ............. 360/15 |
| 4,393,415 | 7/1983 | Hurst . |
| 4,404,602 | 9/1983 | Hoshimi et al. . |
| 4,410,917 | 10/1983 | Newdoll et al. . |
| 4,496,997 | 1/1985 | Ohtsuki . |
| 4,506,387 | 3/1985 | Walter . |
| 4,512,527 | 4/1985 | Rehklau et al. . |
| 4,558,376 | 12/1985 | Heitmann . |
| 4,584,613 | 4/1986 | Amari . |
| 4,611,252 | 9/1986 | Igata et al. . |
| 4,866,543 | 9/1989 | Cooper et al. .................. 360/15 |

FOREIGN PATENT DOCUMENTS

| | | |
|---|---|---|
| 0052519 | 5/1982 | European Pat. Off. . |
| 2907987 | 9/1980 | Fed. Rep. of Germany . |
| 54-25717 | 2/1979 | Japan . |
| 55-105828 | 8/1980 | Japan . |

(List continued on next page.)

OTHER PUBLICATIONS

"Complete Guide to Video Cassette Recorder Operation and Servicing", Lenk, Prentice-Hall, Inc., ©1983, pp. 24–25.

(List continued on next page.)

*Primary Examiner*—Robert L. Richardson
*Attorney, Agent, or Firm*—Benoit Law Corporation

[57] ABSTRACT

In a method and apparatus for transmitting information from producer to end viewers, the information is provided on a first recording medium recorded at a standard speed and in a standard format in a series of tracks slanted relative to a direction of movement of that medium. The information is reproduced from the series of tracks on the first recording medium in the form of electric signals seriatim at increased speed on the order of a multiple of the standard speed. The reproduced information is simultaneously rerecorded from the electric signals seriatim in a standard format with series of tracks on several second recording media at the increased speed, for replay of that recorded information by several end users at different times from the several recording media at standard speed. Additionally or alternatively, second synchronization signals having frequencies increased by the above mentioned multiple relative to a standard synchronization frequencies may be provided, and the electric signals may be processed with those second synchronization signals. From these second synchronization signals, third synchronization signals having the standard frequencies may be derived for synchronizing the above mentioned reproduction and rerecording processes.

87 Claims, 4 Drawing Sheets

FOREIGN PATENT DOCUMENTS

| | | |
|---|---|---|
| 55-105829 | 8/1980 | Japan . |
| 56-7242 | 1/1981 | Japan . |
| 57-3229 | 1/1982 | Japan . |
| 57-203232 | 12/1982 | Japan . |
| 58-139339 | 8/1983 | Japan . |
| 58-143410 | 8/1983 | Japan . |
| 287127 | 1/1971 | U.S.S.R. . |

OTHER PUBLICATIONS

Jefferson Graham, "Holy backlog! 'Batman' will be late on tape," USA Today, Oct. 23, 1989, p. 1.

John Streets et al., "Development of an Ultra Wide Band Video Tape Recorder", IBC Proc. 1982, Brighton.

Yuma Shiraishi, "History of Home Videotape Recorder Development," SMPTE Journal, Dec. 1985, pp. 1257–1263.

National/Panasonic VHS Hi–Fi Training Manual, No. VRD–8510–232.

Panasonic Omnivision II VHS Service Manual No. VRD–8305–406, vol. 3.

Bosch Fernseh, Video Tape Recorder BCN 41/51A, 4–16710–00–BE.

Automatic Videotape Loader Brochure, King Instrument Corporation, Model 590, 1984.

Videotape Loader Brochure, Tapematic Corporation, Model 3000.

Video Cassette Loader Brochures, Otari Corporation, Model T–303 and Model T–301.

Tape Automation Product Information Code, Tape Automation Limited, Oct. 1987.

Automatic Loading System for VHS Cassettes, Enhanced Tape Duplication, and Xenon Brochures, Shape International.

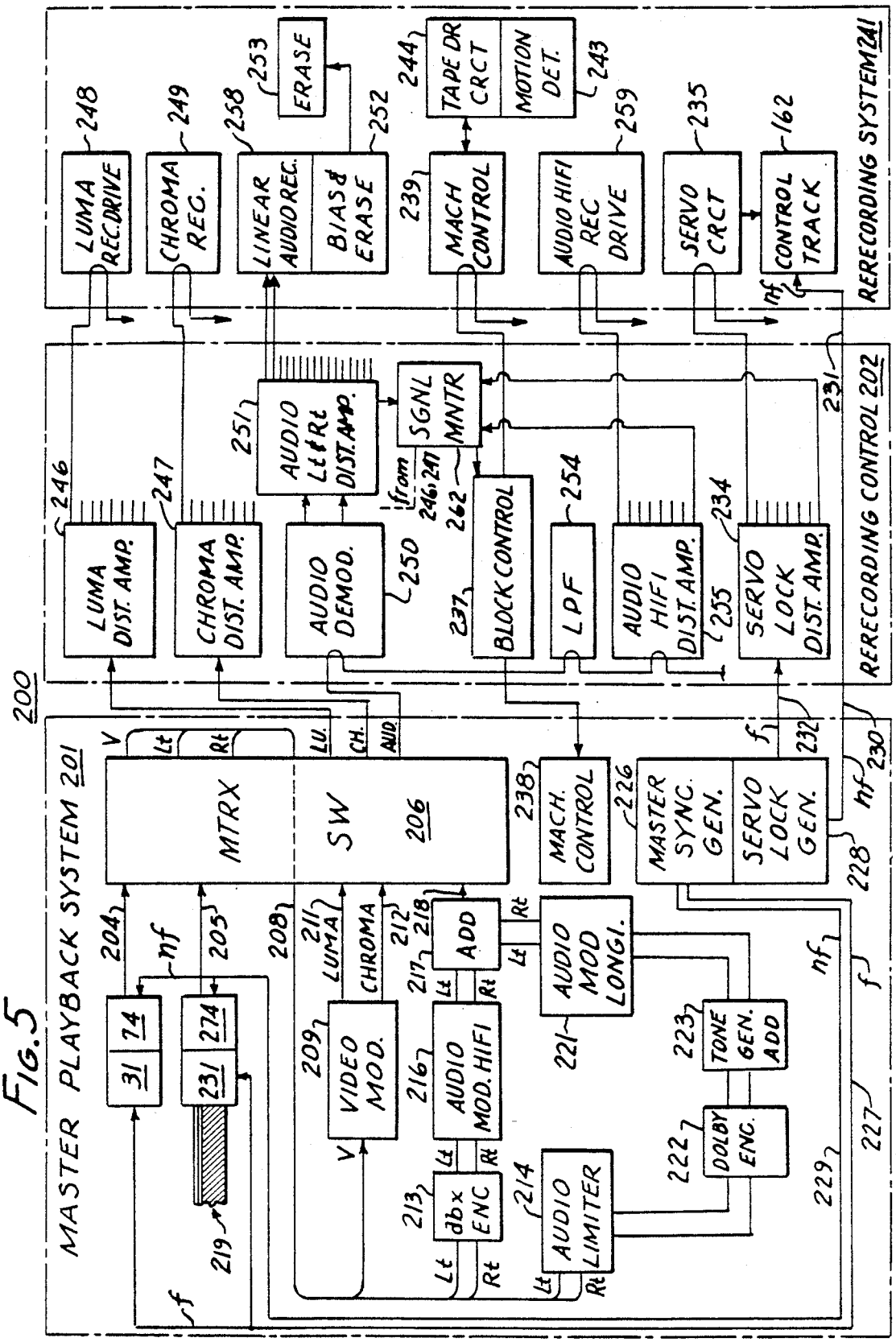

though not necessarily being of itself pertinent. Also, the following comments contain conclusions and observations which have only been drawn or become apparent after conception of the subject invention or which contrast the subject invention or its merits against the background of developments which may be subsequent in time or priority.

TRANSMITTING INFORMATION FROM PRODUCER TO END USERS THROUGH SLANT-TRACK TAPE-TO-TAPE COPYING AT HIGHER-THAN-STANDARD SIGNAL TRANSMISSION

BACKGROUND OF THE INVENTION

Cross-Reference to Parent Application

This is a continuation in part of application Ser. No. 06/906,822, filed Sept. 12, 1986 and now abandoned, by Eugene D. Warren, William C. Laumeister, and Louis L. Pourciau, assigned to the common assignee hereof, and hereby incorporated by reference herein.

FIELD OF THE INVENTION

The subject invention relates to the transmission of information from producer to consumer, and, more specifically, to systems for transmitting video or other slant-track recorded information from producer to end users or viewers via recording and duplication processes and equipment.

INFORMATION DISCLOSURE STATEMENT

The following disclosure statement is made pursuant to the duty of disclosure imposed by law and formulated in 37 CFR 1.56 (a). No representation is hereby made that information thus disclosed in fact constitutes prior art, inasmuch as 37 CFR 1.56(a) relies on a materiality concept which depends on uncertain and inevitably subjective elements of substantial likelihood and reasonableness and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments which may be subsequent in time or priority.

Fifty years ago, a major radio communication company decided as a matter of corporate policy to enter the then still very experimental television field. From the start, this necessitated an intensive search for suitable transmission frequencies, since a major stumbling block in the way of television was the very high bandwidth required for the transmission of acceptable video signals. Very high radio frequency transmission through transmitting antennae generally was seen as the only practical approach to large-scale video broadcast. The ensuing struggle for suitable television transmission channels lead to an unfortunate jockeying for television channel frequency allocations, to the detriment of the then nascent field of frequency modulation (FM) radio broadcasting, which at least in the United States wound up with frequency allocations that are less than ideal to its wide-band transmission purpose.

As a result of the quasi-optical nature of very high and ultra-high radio frequency signals (VHF and UHF), there always remained geographical areas that could not effectively be covered by video broadcasting. In consequence, community television antenna systems (CATV) arose, which received "off the air" television broadcasts with community antennae for distribution through local coaxial cable networks. A combination of increased demands and aggressive marketing brought about widespread cable television systems even in areas where "off the air" television reception would be acceptable. Such Cable TV systems can provide more and better motion picture entertainment than "off the air" television stations. However, the price Cable TV operators have to charge therefor is considerable and increasing. In addition, Cable TV is plagued by increasing operating, service and personnel problems, and deteriorating customer relations.

Part of the problem stems from the advent of satellite retransmission systems which beam television programs from outer space, making increasing inroads into profitable marketing areas of Cable TV. Fortunately for Cable TV, television systems from outer space satellites still require sizable parabolic antennae which, in some communities, are restricted in location and number by local building codes, while being banned altogether in others.

However, there are serious questions to what extent Cable TV can survive as a major communication tool, as satellite television systems become more sophisticated and develop smaller antenna technology.

Even then, better ways will be needed for transmitting video information or programs from producer to viewers. In the case of video entertainment, production and distribution of prerecorded media for playback by individual viewers has become very popular to the extent of converting video record duplication technology into a recognized mode of transmitting video information from producer to viewers, in parallel to traditional television program broadcasting, conventional Cable TV, and state-of-the-art satellite television broadcasting. In short, what started out as an adjunct to home video recording is maturing into a video transmission channel of its own, from performer and producer to millions of viewers.

However, while prerecorded video has been assuming an identity as a video transmitting mode of its own, attainment of its full potential as a distinct video transmission channel has been impeded by a bottleneck that was thought to be endemic to its technology.

Three-quarters of a century ago U.S. Pat. No. 1,116,949 by C. Stille, issued Nov. 10, 1914, for Telegraphic Photography, proposed an electromagnetic wire recorder for picture transmission, and suggested that "the magnetized wire can be made to run before the poles of the electromagnets with a speed which is independent of the optical operations." However, as the next seventy years up to the subject invention showed, there was no way of realizing Dr. Stille's dream. To the contrary, the actual history of video recording in general can be characterized as a struggle with a recording medium and technology whose bandwidth practically corresponds to the bandwidths of the video signals to be recorded. As is typical in such struggles, everything was purchased at a price, as may, for instance be seen from an article by Yuma Shiraishi, entitled "History of Home Videotape Recorder Development," SMPTE Journal, December, 1985, pp. 1257–63.

For instance, the first video tape recorder (VTR) mentioned in that article required ten separate channels for recording video signals longitudinally on multiple tracks. Required tape speed was 100 inches or 2.54 meters per second. The second VTR mentioned reduced the number of required channels to three, but increased tape speed to 360 inches or 9.144 meters per second. Of course, such high tape speeds were just plain useless.

The break toward a lasting solution came with transverse scan and slant track recording and playback coupled with appropriate modulation of the video signal for recording purposes. Tape speed was reduced very drastically by recording and playback in transverse or slanted tracks with rotating recording heads. While this eventually put video tape recording and playback into the hands of individuals in their homes, the new technique engendered other problems. A good background in this respect was given in Soviet Author's Certificate 287 127, by V. F. Zaychenko, issued Jan. 14, 1971 for copying tape recordings with oblique or slanted tracks.

In particular, as that Soviet certificate points out, known methods for copying slant track recordings use two ordinary recorders with rotating heads which read out the signal tracks in succession. That Soviet certificate, which obviously refers to a slant track recording apparatus in series with a slant track playback apparatus, points out that the main disadvantage of that method is low copying speed.

The solution proposed by that Soviet certificate is that, in order to increase the tape speed by a whole number of times with respect to the recording speed of the initial signals, the number of simultaneously read-out tracks by the reproducing and recording apparatus is increased by the same whole number of times. By way of example, this Soviet certificate mentions a simultaneous scanning of three slanted tracks of a master tape, together with a simultaneous recording of three slanted tracks of a copy tape, for a three-times increase in speed of the master and recording tapes. This might be a fine approach to the problem, if it worked in practice.

However, a good idea of the problem may be gained from U.S. Pat. No. 4,558,376, by J. Heitmann, issued Dec. 10, 1985, for method and system of reproduction of magnetically recorded video signals at speeds differing from recording speed. As Heitmann points out, the scanning tracks of reproduction heads do not coincide with the recorded tracks in this kind of situation. Of course, in the Soviet proposal, this would not only affect the playback from the master tape at the copying station, but also the playback of each copy tape at the end user, such as at video home recorders operated as playback apparatus for the copy tapes. The solution which Heitmann proposes includes the provision of a further magnetic head positioned so that signals which are not scanned by one head are, effectively, scanned by another head, whereby, by use of a programmed memory, the signal can be stored in proper sequence for reproduction as essentially complete video signal, for read out in accordance with a desired scanning standard, in analog or digital signal form. More specifically, Heitmann temporarily stores reproduced signals which are of a quality sufficient for reproduction, reads out these temporarily stored signals subsequently at a predetermined television scanning standard, and controls the relative axial position of at least two axially adjustable transducer heads on the head wheel with respect to each other as a function of the relationship between recorded speeds and reproduction speeds to place a maximum number of transducer heads in scanning transducing position over the previously recorded tracks.

While that may be a fine solution for special circumstances, one obviously cannot expect owners and users of standard video tape recorders and playback apparatus to replace their equipment by still more costly machines, just in order to play back duplicated video tapes.

To put it differently, tapes copied according to the Soviet proposal simply would have no market among present or potential viewers of video programs. Even if some solution could be found, the Soviet proposal still would be practically limited to copying between like tape and recording formats, which is very unrealistic, considering that a high-quality first generation copy usable in home VCRs typically requires working from a broadcast or studio quality master having a radically different format.

A subsequent proposal disclosed in U.S. Pat. No. 4,108,365, by Robert M. Hughes, issued Aug. 22, 1978, for coin-operated recording machine, deals with the dubbing of selected audio and/or video recordings stored in the apparatus onto magnetic tape cartridges inserted by customers. Even though that proposal shows a video duplication system in two of its figures, it does not appear to reveal any workable equipment for duplicating video faster than in real time. In other words, the main disadvantage mentioned in the Soviet certificate still has not been remedied. Accordingly, a customer would have to stand around for at least an hour for each one-hour video program he or she wants copied for home video playback.

Yet, the subsequent German Published Patent Application 29 07 987, by Michael P. Oversberg, published 11 Sept. 1980, for cassette tape systems, still proposes no remedy, even though it discloses the duplication of video recordings from one cassette to another.

U.S. Pat. No. 4,393,415, by Robert N. Hurst, issued July 12, 1983, for a time changing system for video tape recording, proposes resynchronization of reproduced signals to a standard speed by repeating or deleting frames when successive frames are substantially identical. Frame averaging can be used in addition or as an alternative. Provision for real time is made to minimize human error. This is another very complicated approach to a persistent problem.

U.S. Pat. No. 4,404,602, by S. Hoshimi et al, issued Sept. 13, 1983, for PCM Signal Recording System, and its related European Patent Application 0 052 519, Sony Corporation and Toshiba, published May 26, 1982, propose referencing both playback and recording to a common source with the aid of different clock signals.

U.S. Pat. No. 4,410,917, by Ronald M. Newdoll et al, issued Oct. 18, 1983 for method of and apparatus for recording information from a master medium onto a slave medium employing digital techniques. Recorded analog information reproduced from a master medium is digitized and stored in a digital storage device, from where it is recovered and reconverted into analog information for recording onto slave media. While information is entered into the digital storage device at the same rate as it was recorded on the master medium, information is recovered from the digital storage device at the faster rate and is also recorded on the slave media at a faster rate than it was recorded on the master medium. However, any time saving thus realized with respect to the rerecording of information on a slave medium is purchased at the heavy price of digital framing buffers and their operating paraphernalia.

U.S. Pat. No. 4,496,997, by Tadashi Ohtsuki, issued Jan. 29, 1985, also proposes copying of video information from one recording medium to another. However, that proposal is more concerned with generating code signals and recording cue data, than with improved video signal copying as such.

Japanese Patent Publication 57-3229, by Kenichi Sawazaki, published Jan. 8, 1982 in the name of Tokyo Shibaura Denki K. K., proposed a copying and recording system manifestly unsuitable for copying slant-track recordings. Rather, linear heads were shifted by one track pitch for every lap of the recording medium in an effort to shorten duplicating time in proportion to the number of heads. No copies reproducible by standard VCRs or similar standard playback machines could be produced in this manner.

Japanese Patent Publications 57-203232 and 58-139339 by Masao Tomita, published Dec. 13, 1982 and Aug. 18, 1983, respectively, in the name of Matsushita Denki Sangyo K. K., propose reduction of duplicating time by increasing tape speed and the number of rotating heads. Out of an expressed prior-art recognition that this not only complicates matters, but that the frequency of the video signals thus become higher and more difficult to handle, both patent publications reject such an approach, unless there is variation and control of head azimuth angle, such as with electrically controlled piezoelectric head mounting devices, or unless the head azimuth angle is alternated among successive rotating heads and the relative tilt of the head drum is changed. The resulting copies only would be commercially saleable for playback with standard equipment if most stringent controls could be implemented.

Japanese Patent Publication 58-143410, by Kenji Nakano, published Aug. 26, 1983 in the name of Sony K. K., proposed a type of copying method for video tapes having an inherent lip sync problem between resulting video and audio presentations. In an effort to correct errors that such a problem would engender, clock frequency at the time of copying is increased by three times normal clock frequency, whereby error correction and adjustment and encoding rate are tripled. While such a procedure is said to prevent degradation of audio accompaniments, it cannot achieve complete lip sync.

As apparent from a writeup by John Streets et al, entitled "Development of an Ultra Wide Band Video Tape Recorder," IBC Proc. 1982, Brighton, in order to record at higher band width or to record two video signals multiplexed together, head-to-tape velocity and linear tape speed were doubled and the servo and tape control circuits modified to accommodate these changes by modification of the tachometer sense circuits. The resulting records were, of course, not suitable for playback with standard VTRs or VCRs.

No solution of the problem of slant track video or other information duplication became apparent, even after disclosure of a magnetic recording system capable of compressing audio messages for transmission in short bursts in U.S. Pat. No. 3,027,425, by Wesley Tannenbaum et al, issued Mar. 27, 1962, and of a system for transmitting audio and other relatively low frequency information in short periods of time in U.S. Pat. No. 3,781,479, by Maxmillian A. Swoboda, issued Dec. 25, 1973, and of a store and forward speed changer for off-line transmission of binary data in U.S. Pat. No. 3,714,377, by Alfred J. Moretti; nor after disclosure of a sync regenerator capable of reproducing signals in various international television standards in U.S. Pat. No. 3,564,141, by Robert N. Hurst, issued Feb. 16, 1971, or of a video recorder capable of accepting a plurality of horizontal line rates in U.S. Pat. No. 3,893,169, by Robert P. Hall, Jr., issued July 1, 1975, or of a programming-on-demand cable system wherein video programs are transmitted at a high non-real-time rate for subsequent real-time transmission in U.S. Pat. No. 4,506,387, by Howard F. Walter, issued Mar. 19, 1985, or of apparatus for recording video signals at a plurality of different recording speeds in U.S. Pat. No. 4,584,613, by S. Amari, issued Apr. 22, 1986, or of a helical-scan video tape recorder capable of variable-speed reproduction in U.S. Pat. No. 4,611,252, by K. Igata et al, issued Sept. 9, 1986.

Rather, the state of the art, prior to the subject invention, of video tape duplication with rotating heads is manifested by proposals requiring a multiplication of playback and rerecording heads relative to the number of heads specified as standard for each particular slant track recording format.

In this respect, Japanese Patent Publications 55-105828 and 55-105829, by Y. Makino, of Tokyo Shibaura Denki K. K., published Aug. 13, 1980, reassert that, contrary to audio tapes, video tapes cannot be duplicated satisfactorily, if the tape feed or video head revolution speed is raised to two times standard speed or more. Against this background, these Japanese patent publications propose multiplying the number of playback and rerecording heads as well. However, such multiplication, in turn, required the scanner cylinder diameter to be either larger than standard, such as for the Beta format, or smaller than standard, such as for the VHS standard. As apparent from numerous equations in these Japanese patent publications, geometrical parameter relationships became rather complex and the resulting machines became incapable of slant track recording or reproduction at standard speed.

The same applies to the systems disclosed in Japanese Patent Publications 54-25717, by T. Kobayashi; of Sony Corporation, published Feb. 26, 1979, and Japanese Patent Publication 56-7242, by K. Takahashi, also of Sony Corporation, published Jan. 24, 1981, and employing also numerous equations for determining geometrical parameter relationships needed under that approach.

These state-of-the-duplicating-art publications also show that when the breakthrough to higher duplicating speeds finally came, the multiple-times-standard playback and rerecording heads were retained. In other words, the prejudice against higher-than-standard playback and recording speed found a variant in a prejudice against the standard number of heads, which prejudice, as shown above, was engendered by the prejudice against higher duplication speeds.

As a result of such perpetuated prejudice, the more advanced prior art still insisted on using multiple heads (multiples of the standard number of heads for the standard format duplicated) with all the attendant problems of nonstandard scanner cylinder diameter, modified scanner cylinder tilt angle and/or continuous scanner head tracking control, each of which introduces problems of its own.

Attempts at rendering equipment alternatively suitable for high-speed and standard speed operation by making the scanner cylinder tilt angle switchable between two values, as in the above mentioned Matsushita Japanese Patent Publication 58-139339 by Masao Tomita, shed further light on the complexities engendered by the above mentioned prior-art prejudice.

SUMMARY OF THE INVENTION

It is a general object of this invention to overcome the disadvantages and to meet the needs expressed or implicit in the above Information Disclosure Statement or in other parts hereof.

It is a germane object of this invention to provide improved transmission of video and other information from producer to end users.

It is also an object of this invention to provide improved methods and apparatus for duplicating information recorded in slanted tracks.

It is a particular object of this invention to increase the speed of duplication of information recorded in slanted tracks, without the prior-art use of multiple heads, different track angle or continuous head tracking control, different scanner cylinder diameter, or different scanner tilt angle.

It is also an object of this invention to provide improved records of information fixed in tangible media by processes of the subject invention at increased speed relative to standard speed.

It is a germane object of this invention to improve the quality of records and copies of video information relative to the records and copies resulting from prior-art processes which attempted to copy at increased speeds.

It is also an object of this invention to provide improved processing of information signals during duplication processes.

It is a related object of this invention to provide improved synchronization of recording processes.

It is a germane object of this invention to economize video and other information duplication.

It is a related object of this invention to minimize the duplicating company's risk if a duplicated feature does not find favor in the marketplace, while augmenting their capacity to meet the demand for successful features more rapidly than by straight-forward high-speed duplication into cassettes.

Other objects of the invention will become apparent in the further course of this disclosure.

From one aspect thereof, the invention resides in methods and apparatus for transmitting information from producer to end users without deliberate omission of information tracks, wherein the information is provided on a first recording medium for ultimate playback at a standard speed from a standard format in a series of tracks slanted relative to a direction of movement of the recording medium with a predetermined standard number of playback devices or heads correlated to that standard format. The invention according to this aspect resides in the improvement comprising in combination the steps of, or means for, reproducing the information in the form of electric signals seriatim from the first recording medium at increased speed on the order of a multiple, n, of the standard speed, and simultaneously rerecording that reproduced information from those electric signals seriatim in the standard format with series of tracks on several second recording media at the increased speed with recording devices or heads of only the predetermined standard number for each of the second recording media, the second recording media being moved at a speed being n times a speed standard for said second recording media in said standard format and said heads being rotated at a speed being n times a head speed standard for that standard format, for replay of that recorded information by several end users at different times with the predetermined standard number of playback devices or heads from the several recording media at standard speed.

From a related aspect thereof, the invention resides in methods and apparatus for transmitting information from producer to end users without deliberate omission of information tracks, wherein the information is provided on a recording medium for ultimate playback at a standard speed from a standard format in a series of tracks slanted relative to a direction of movement of the recording medium. The invention according to this aspect resides in the improvement comprising in combination the steps of, or means for, reproducing the information in the form of electric signals seriatim from the recording medium at increased speed on the order of a multiple of the standard speed, simultaneously rerecording that reproduced information from those electric signals seriatim in the standard format with series of tracks on bulk tape at the increased speed, and subsequently loading at least part of that bulk tape in the form of program-length tape sections having the reproduced information rerecorded thereon into cassettes for replay of the rerecorded information by several end users at different times from the loaded cassettes at standard speed.

From a related aspect thereof, or in addition, the subject invention resides in methods and apparatus for duplicating information recorded on a first recording medium at standard speed with the aid of first synchronization signals having standard synchronization frequencies, and more specifically resides in the improvement comprising in combination the steps of, or means for, generating second synchronization signals having increased frequencies on the order of a multiple of the standard synchronization frequencies, reproducing the recorded information from the first recording medium in the form of electric signals at increased speed corresponding to the increased synchronization frequencies, processing the reproduced information in the form of said electric signals with the second synchronization signals having the increased frequencies, deriving from the second synchronization signals having the increased frequencies third synchronization signals having the standard synchronization frequencies, simultaneously rerecording the reproduced information from the processed electric signals on several second recording media at the increased speed, for replay of the rerecorded information by several users at different times from the several recording media at the standard speed, and synchronizing that reproduction and rerecording with the third synchronization signals.

The subject invention resides also in records of information fixed in tangible media produced by methods according to the subject invention as articles of manufacture for replay of the thus recorded information by several end users at different times, but at standard speed.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functioning equivalent parts, and in which:

FIG. 4 is a schematic showing how FIGS. 1, 2, and 3 should be combined in series to show the video information transmission systems from producer to viewers according to the illustrated preferred embodiments of the subject invention; and FIG. 5 is a block diagram of a master playback control and rerecording system according to a further preferred embodiment of the invention.

DESCRIPTION OF PREFERRED EMBODIMENTS

Figure 1:
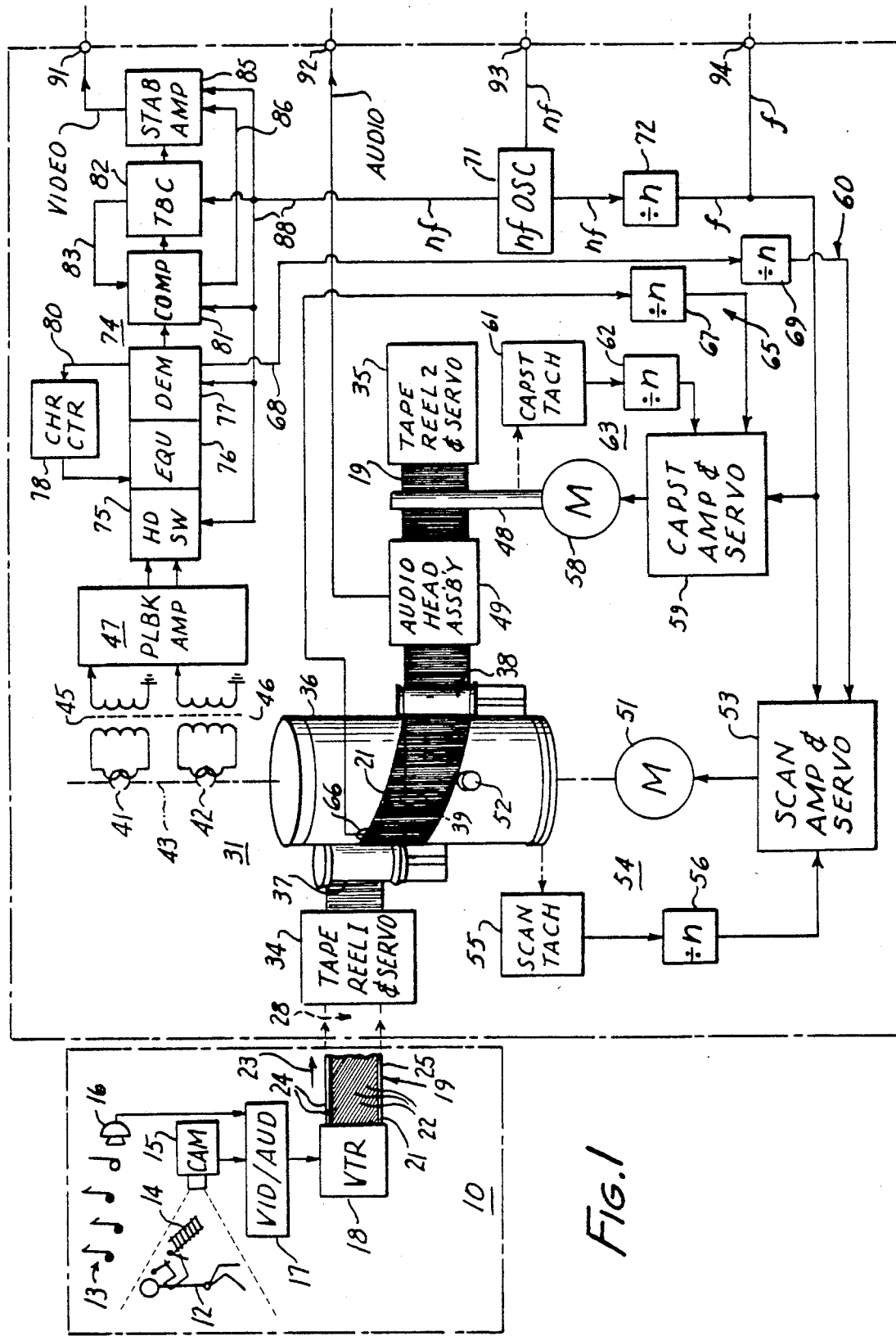
FIG. 1 is a block diagram and a diagramatic view of video information production, reproduction and signal processing, according to preferred embodiments of the subject invention.
Figure 3:
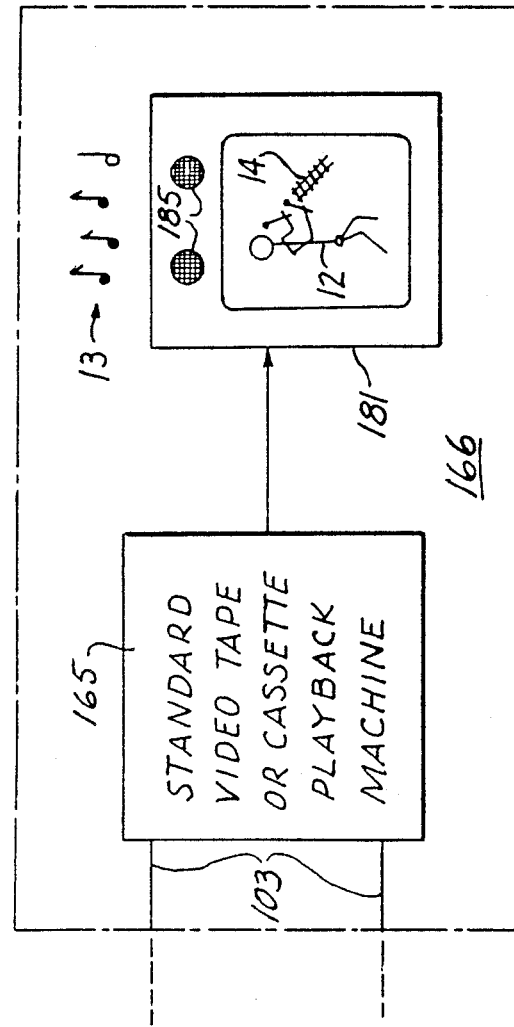
FIG. 3 is a block diagram of equipment for replay of the rerecorded video information by several viewers at different times from several recording media at standard speed.
Figure 3:
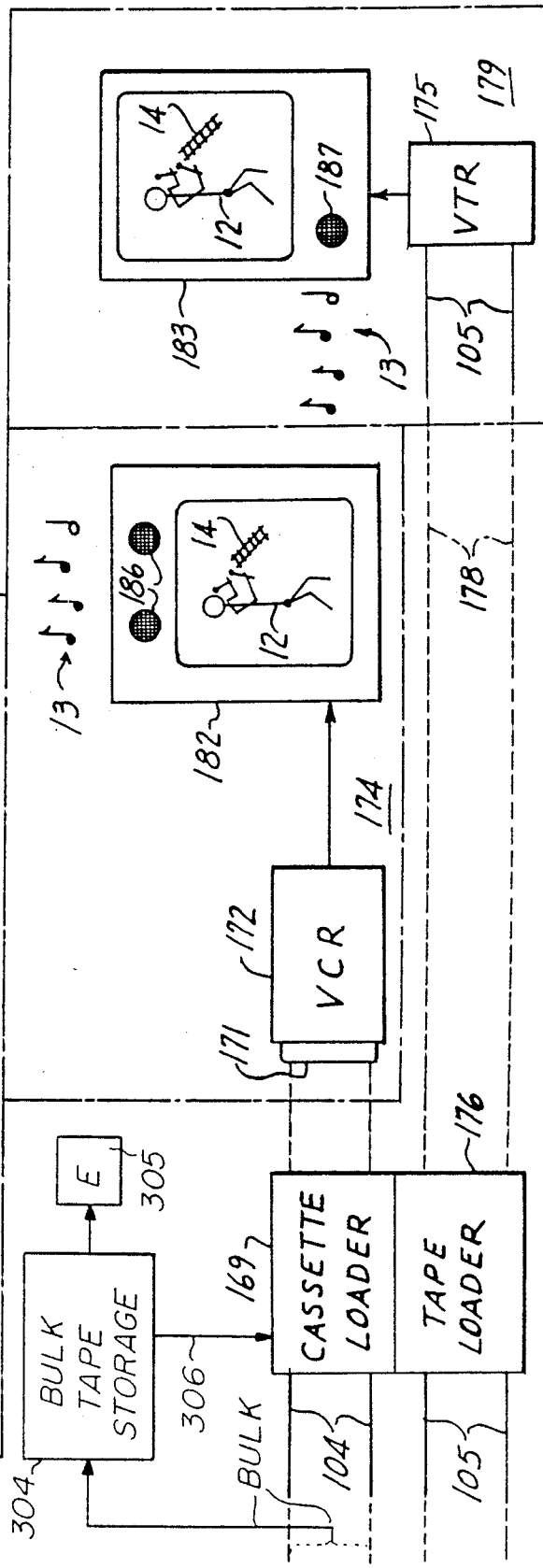
Figure 2:
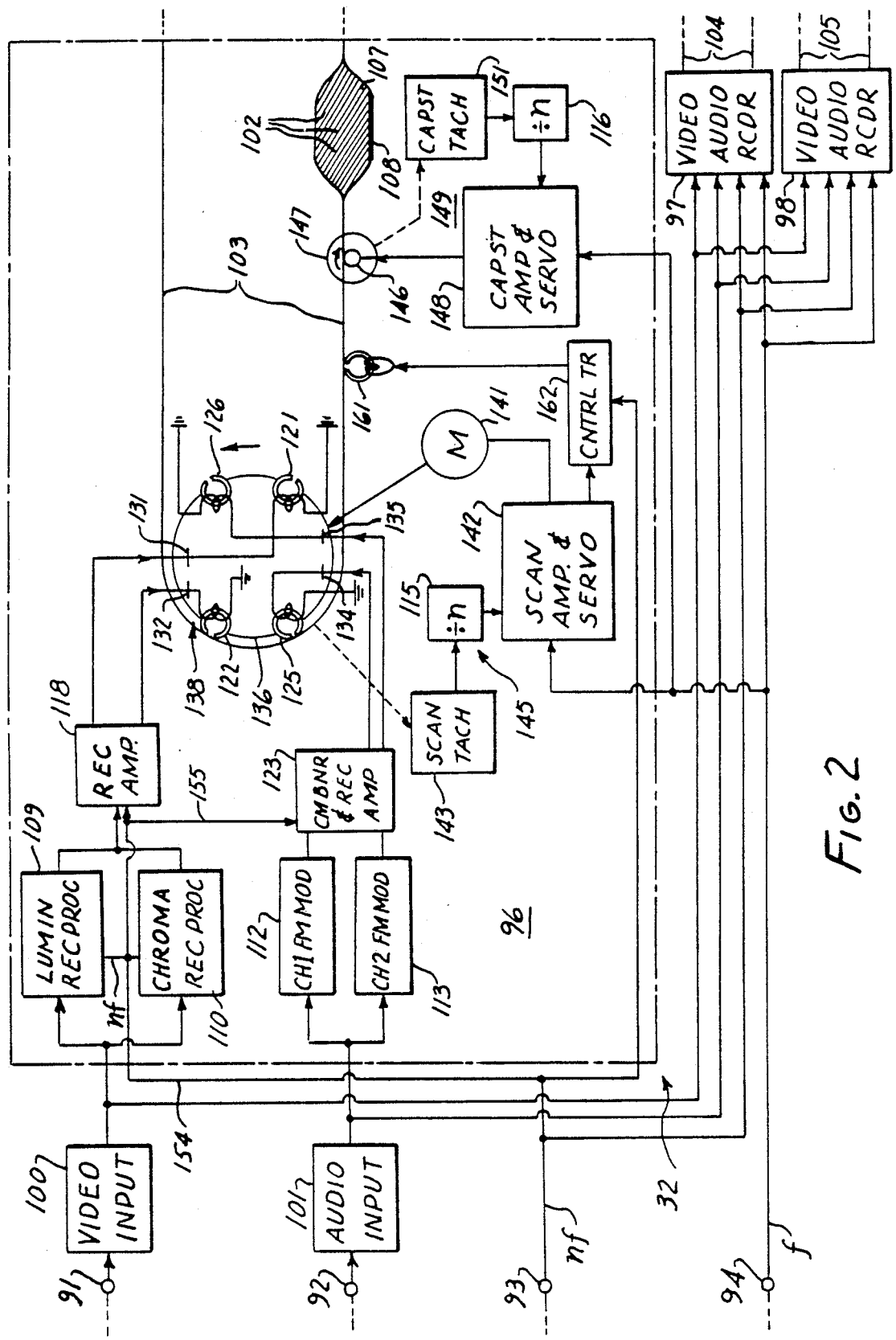
FIG. 2 is a block diagram and diagramatic view of apparatus for simultaneously rerecording video information reproduced and processed according to FIG. 1.

FIGS. 1 to 3, when arranged in the manner shown in FIG. 4, illustrate a system for transmitting video information from producer to viewers, according to preferred embodiments of the subject invention.

While "video" basically refers to seeing, and "audio" generally refers to hearing, the subject disclosure does not intend a strict dichotomy along this line, as far as the expression "video" in compound form is concerned. For instance, the expression "video information" as herein employed is intended to be broad enough to include audio accompaniment of video signals or programs. Indeed, even silent motion pictures of yesteryear are, and even then were, generally replayed with a sound accompaniment. Today, video information, features and programs for education and entertainment would hardly be saleable, if they were distributed without a synchronous sound accompaniment of the displayed action.

Accordingly, FIG. 1 shows a studio and video recording production facility in which a performer or entertainer 12 creates viewable action and audible sound 13 by playing a xylophone, marimba or other musical instrument 14. A video or motion picture camera 15 takes the action either on film or in the form of a video signal. One or more microphones, symbolically shown at 16, generate electric signals containing the sound accompaniment.

The outputs of camera 15 and microphone facility 16 are applied to video/audio processing equipment 17. For instance, film exposed in a motion picture camera may be developed or video signals produced by a video camera may be recorded for further processing. The audio accompaniment may be recorded on the same medium as the video action, or may in fact be recorded separately for subsequent unification with the video portion. Cue signal provision and editing apparatus of the type mentioned in the above-mentioned Ohtsuki patent may be employed at that point, as may other conventional motion picture and video recording techniques and facilities. The result of such efforts typically is applied to a video tape recorder 18 which produces a video program or information record 19. In other words, the reference numeral 10 in effect represents the production facility or producer of what is referred to herein as the video information provided on a first recording medium 21 recorded at a standard speed and in a standard format in a series of tracks 22 slanted to a direction of movement 23 of the first recording medium. In other words, the video tape recorder 18 is a conventional recorder or otherwise records the video information at a standard speed in a standard format, such as the slant track format shown in FIG. 1. In this respect, the video tape recorder could be a conventional transverse scan recorder or a slant track recorder producing video recordings in a standard format generally recognized in the industry as such.

As already indicated above, "video information", "video recording" and expressions of like import are terms of art typically implying the presence of a sound accompaniment. Indeed, the video recording 19 includes conventional audio tracks, in addition to synchronization and control signal tracks, one of which is shown at 25.

According to conventional practice, the audio accompaniment is recorded longitudinally, while the video signal is recorded in slanted tracks. However, this need not necessarily be the case, since the audio accompaniment could be recorded along with the video signal or otherwise in the area of the video signal recording, such as according to a technique described, for instance, by Shiraishi on the last page of his above mentioned SMPTE article.

Also, while video tape recording, duplication and playback have been emphasized herein, it should be understood that the video information, including the video signal and audio accompaniment, could be recorded or present on other media, such as video disks, for instance.

As shown by dotted outline 28 in FIG. 1, the produced master tape or other video recording 19 is applied to a reproducing facility or playback apparatus 31. That reproducing facility and the rerecording facility 32 shown in FIG. 2 may be viewed as the video duplication facility according to the illustrated preferred embodiment of the subject invention.

It is a special advantage of the subject invention that basically conventional playback and recording equipment may be employed at 31 and 32 in conjunction with the processes and features of the subject invention. This is not a step backward from the more complicated prior proposals described above, but is a rather sophisticated approach that builds the new on selected items of the old, thereby arriving at combinations which work quite well, where more complicated approaches have failed in toto or for practical purposes.

Also, it will be seen that the subject invention is capable of producing complete video recordings, where recent endeavors of large corporations in the field produced copies by deliberately omitting information content or degrading information quality.

Dotted lines 28 in FIG. 1 thus signify the flow of essentially undergraded video information from studio and producer 10 to the copying or duplication facility 31, 32 in the form of high-quality video records or tapes to be duplicated.

In principle, the same kind of machine may be used at 18 and at 31, with the machine at 18 operating as a recorder and the machine at 31 as a reproducing or playback facility. However, the subject invention is not limited to the use of the same kind of machine at 18 and at 31, as long as the playback machine at 31 can handle the kind and format of the video information recorded at 18.

If the recording medium 21 is a magnetic recording tape, then such first recording medium typically will arrive at the reproduction facility 31 on a tape reel such as the first tape reel 31 symboically indicated in FIG. 1 together with its servo system. Conventional tape reel servo systems may be employed for this purpose, and FIG. 1 thus only indicates the first and second tape reels and their servoes symbolically at 34 and 35.

The video tape 21 is supplied from the first tape reel 34 to a scanner assembly 36 which is equipped with two tilted auxiliary rollers 37 and 38 for an oblique guidance of the tape at an acute angle to the plane of a rotary headwheel, shown in dotted outline at 39. As is well known in that art, the wrap angle of the tape 21 around the scanner drum depends on the number of active video heads on the headwheel 39. In this case, the wrap angle is somewhat greater than 180°, such as 190° omega wrap, at an appropriate tilt angle, such as 14.4° relative to the headwheel plane.

For increased clarity, the video playback heads 41 and 42, actually located diametrically opposite of each other on the headwheel 39, are shown in FIG. 1 above the scanner assembly 36 along a phantom line 43. The scanner assembly also includes rotary transformers 45 and 46, normally located in the scanner drum, for applying the played-back video signal to a playback preamplifier or amplifier 47. A tape drive spindle or capstan 48, which may be assisted by a pinch roller (not shown), advances the tape from the scanner assembly via an audio head assembly 49 to the second tape reel 35, which winds the tape 19 thereon.

The practice of the subject invention is not limited to the use of any particular makes or models of equipment. However, use of a head drum assembly having a drum or head-wheel diameter of about 2 inches or 50 mm is presently preferred, as suited to the increased head rotation and tape speeds according to the subject invention.

In this respect, the best mode presently contemplated for carrying out the subject invention employs a video tape recorder, Type BCN 41/51 A manufactured and sold by the Fernseh Department of Robert Bosch GmbH, the West German Assignee of the above mentioned Heitmann U.S. Pat. No. 4,558,376.

Within the scope of the subject invention, the playback machine 31 may, for instance, be of a type in which video and its audio accompaniment are recorded in the same tracks or in the area of these slanted tracks 22, for instance, as mentioned on the last page of the above mentioned SMPTE article by Shiraishi, and as more fully described in connection with the rerecording equipment 32 shown in FIG. 2.

The playback machine 31 reproduces the video information from the series of tracks 22 on the first recording medium 21 in the form of electric signals seriatim at increased speed on the order of a multiple of the standard speed at which the video information was recorded at 18 by or for the producer. Strictly speaking, while the expression "video information" is sufficiently broad herein to cover also audio accompaniments, such audio accompaniments are, of course, not played back from the slanted tracks 22, unless they have been recorded therein as mentioned above. In the embodiment shown by way of example in FIG. 1, the audio accompaniments are played back from longitudinal tracks 24 by the audio head assembly 49. Since there is generally no problem in reproducing and rerecording audio at increased speeds, that phase of the operation, while useful when audio accompaniments are present, is not emphasized herein.

A motor 51 rotates the headwheel 39 in the scanner drum assembly 36. In principle, a scanner assembly with rotary head drum could be employed. However, in the embodiment illustrated in FIG. 1, both head drum parts are stationary, and a projecting pin 52 is provided to prevent the tape from falling off the scanner drum during threading of the tape.

The scanner motor 51 is energized and controlled by a scanner amplifier and servo 53, which is in a servo loop 54 including a scanner tachometer 55 and a divider 56.

Similarly, the tape advance capstan 48 is driven by a motor 58 which is energized by a capstan drive amplifier and servo 59. A capstan tachometer 61 and divider 62 are part of a velocity loop 63 including the servo 59. A phase loop 65 for the capstan servo 59 includes a control signal playback head 66 and a divider 67. The control signal playback head 66 is seen on the drum of the scanner 36 at the top margin of the slanted tape 21 for playback of control signals therefrom. These control signals in effect correspond to the type of sprocket holes used with motion picture film and assure the correct phase position of the rotating playback heads 41 and 42. Of course, if such control signals are recorded in the lower control track 25 in a given situation, then the head 66 would be located at the lower margin of the advancing tape.

The servo 53 for the scanner motor 51 may also have a phase loop 60 in addition to the servo loop 54. Such a phase loop may utilize off-the-tape synchronizing signals which a line 68 connected to the demodulator 77 applies to a divider 69 having the purpose and function of dividers 56, 62 and 67.

It may be noted at this point that the dividers 56, 62 and 67 diminish a rate of their input signals by a divisor corresponding to the multiple of the standard speed at which the video information is reproduced and simultaneously rerecorded. By way of example, if it is, for instance, desired to double the speed of the duplication process, the divider 56 would divide the output signal of the scan tachometer by a factor of 2, and would apply such correspondingly diminished output signal to the scan amplifier and servo 53. Accordingly, if the headwheel 39 would not rotate at the desired velocity of twice the standard velocity at which the video information was recorded at 18, the scan amplifier and servo 53 would not receive scan tachometer signals of a sufficient rate. Accordingly, the scan amplifier and servo 53 would cause the scanner drive motor 51 to speed up accordingly. In other words, the servo loop 54 would constantly try to make up for the pulse rate division or diminution at 56, until the scanner wheel 39 has caught up with the desired higher rotation of twice standard speed.

Similarly, the tape velocity loop 63 would try to make up for the diminution inflicted on the capstan tachometer signal by the divider 62, while the phase lock loop 65 would try to make up for the diminution of "sprocket hole signals" brought about by the divider 67. In consequence, the tape drive motor 58 would cause the tape 19 to catch up with the desired double velocity thereof. In this manner, the illustrated preferred embodiment avoids the major drawback of the above mentioned Soviet proposal, while at the same time avoiding Heitmann's complex tracking angle servo system with its axially adjustable transducer heads.

Of course, for proper operation, the servoes 53 and 59 need appropriate synchronization signals. In this respect, these servoes could be redesigned to operate at twice standard synchronization frequency. However, such a redesign would be rather costly and time consuming in practice.

A generally better approach is to operate the servoes at standard synchronization frequency, f. In that respect, the conventional local oscillator supplying the standard synchronization frequency, f, could be employed. This, indeed, would be the obvious way of solving the problem.

However, the illustrated preferred embodiment of the invention avoids that obvious way in the interest of a superior solution.

In particular, the illustrated preferred embodiment provides second synchronization signals having frequencies, nf, increased by the selected multiple relative to the standard synchronization frequencies. In this respect, the standard synchronization frequencies refer to the synchronization frequencies used at 18 in FIG. 1. In other words, the producer at 10 recorded the video information on the first recording medium 21 at a standard speed and in a standard format with the aid of first synchronization signals having standard synchronization frequencies, f. The illustrated preferred embodiment then provides a local oscillator 71 for providing second synchronization signals having frequencies, nf, increased relative to the standard synchronization frequencies, f, by the above mentioned multiple of the reproduction and rerecording speed relative to the standard speed at which the recording was made at 18.

For instance, if the speed of the duplication process is doubled, then the factor, n, shown in the drawings is equal to two. Of course, the desired multiple need not be an integer, and the duplication process may be increased by a factor of more than two, within the scope of the subject invention.

A divider 72, similar to the dividers 56, 62 and 67, is employed for diminishing the output of the local oscillator 71 to the standard frequency, f, for driving the scan and capstan servoes, including those shown at 53 and 59 in FIG. 1. On the other hand, the undiminished oscillator frequency, nf, is still employed in the processing of the video signal between reproduction and rerecording. In this manner, the illustrated preferred embodiment of the invention not only avoids the ambiguities that would be introduced by synchronization frequency multiplication, but at the same time provides the obtimum synchronization frequency for each purpose, namely f for the scan and capstan servoes of the reproduction and rerecording equipment, and nf for the best possible signal processing between reproduction and rerecording. At the same time, the dividers 56, 62, as well as their counterparts in the rerecording equipment 32, avoid the kind of phase ambiguity that afflict frequency multiplication.

The video signal handling and processing equipment 74 shown in FIG. 1 may be composed of essentially conventional components. For instance, the playback amplifier 47 may apply the reproduced video information in the form of electric signals to a head switching device 75 which applies the amplified output of the rotating playback heads 41 and 42 to the type of playback equalizer 76 present in such circuits.

The equalizer, in turn, applies its output to a demodulator 77. The kind of chroma control 78 present in such circuits for chroma correction in the case of color video signals, is located in a feedback loop 80 extending from the demodulator 77 to the playback equalizer 76.

The output of the demodulator 77 is applied to a drop-out and velocity error compensation 81 which applies its output to a time base corrector which, in a manner conventional per se, applies its time base correction control signal via lead 83 to the compensation 81. The time base corrector 82 applies its time base corrected output signal to a color stabilizing amplifier 85 which also receives conventional color dropout compensator or Color DOC and velocity error compensation signals via a line 86 from the drop out and velocity error compensation 81.

Synchronization signals of increased frequency nf are applied via lines 88 to the head switching device 75, demodulator 77, compensation 81, time base corrector 82, and color stabilizing amplifier 84 to synchronize their operation and thereby the processing of the video information between reproduction and rerecording.

For increased clarity, FIGS. 1 and 2 show identical terminals 91, 92, 93 and 94 for processed video signals, audio signals, higher synchronization frequency signals nf and lower synchronization frequency signals f, respectively. In other words, the output of the reproduction system 31, as well as its synchronization signals, are applied to the input of the rerecording system 32, including several video tape recorders, three of which are seen at 96, 97 and 98 in FIG. 2.

The rerecording system 32 or recorders 96, 97, etc., simultaneously rerecord the reproduced video information from the electric signals received through a video input 100 and audio input 101 seriatim in a standard format with a series of tracks 102 on several second recording media 103, 104, 105, etc., at the increased speed, for replay of the rerecorded video information by several viewers at different times from the several recording media at standard speed, as more fully explained below in connection with FIG. 3.

In accordance with standard practice, the rerecorded video tapes 103, 104, 105, etc., also could include longitudinal audio recording tracks of the type shown at 24 in FIG. 1. However, as explained above and as described by way of example on the last page of the above mentioned SMPTE article by Shiraishi, audio accompaniment can be recorded directly in with the video signal. For instance, the audio signal may be frequency-modulated and recorded mixed with the video carrier using an appropriate frequency spectrum allocation. According to a further method, frequency-modulated audio signals are recorded by independent audio heads, and the video signal is recorded over it using separate video heads. Accordingly, the flipped-over portion 107 shown in FIG. 2 for the tape 103 does not show any audio channels, even though such could be provided, if desired. A control signal track 108 is, however, shown along the slanted video tracks.

The control signal could alternatively be frequency multiplexed and recorded mixed with the audio and video signals using an appropriate frequency allocation.

The video input 100 in FIG. 2 may comprise a recording preamplifier, signal processor, or simply a terminal connected to a luminance signal recording processor 109 and to a chromanance signal recording processor 110. Similarly, the audio input 101 may comprise a recording preamplifier, signal processor, or simply a terminal connected, for instance, to frequency modulators 112 and 113 in two audio stereo channels. Of course, in such a case the audio signal would preferably be recorded in separate stereo channels at 24 in FIG. 1 as well.

In principle, apparatus shown in FIG. 1 at 31 for reproduction could also be used at 96 to 98 for rerecording. However, such is not a requirement of the subject invention, and reproduced video information can be rerecorded on any desired format with a variety of recorders that can operate at the desired multiple of standard speed.

By way of example, the currently contemplated best mode of carrying out the invention or its preferred embodiments employs at 96, etc., video cassette recorders of the Type AG-6300, Panasonic, VHS format.

Except for the frequency dividers 115 and 116, the components shown in FIG. 2 may be of the type supplied with such commercial recorders.

The outputs of the luminance and chromanance signal recording processors 109 and 110 are applied to a recording amplifier 118 for recording on the tape 103 by a pair of rotating video recording heads 121 and 122. Any requisite remodulation of the video information and related signals may be done at 109, 110 or at 100 jointly for all recorders 96, 97 and 98.

Similarly, after frequency modulation, the stereophonic audio channels are applied to a conventional type of combiner and recording amplifier 123 which supplies the audio information to a pair of rotating audio recording heads 125 and 126. Again, rotary transformers preferably are used for conveying the video and audio signals to their respective recording heads. While suitable rotating transformers have been shown in FIG. 1 at 45 and 46, such rotating transformers have only symbolically been indicated at 131 to 135 in FIG. 2. The rotary headwheel has been shown at 136 in FIG. 2, and it should be understood that such headwheel is part of a scanner assembly 138 in which the tape proceeds at a helical slant through an omega wrap, such as shown at the scanner 36 in FIG. 1. If desired, what has been called herein a headwheel 136 may in fact be a rotating cylinder on which the recording heads are mounted.

The scanner 138 is driven by a scanner motor 141 which is energized by a scanner drive amplifier and servo control 142. A tachometer signal is derived from the scanner by a scanner tachometer 143 which applies tachometer pulses to the divider 115 in a scanner servo amplifier loop 145. As in the case of the scanner servo loop 54 described above with respect to FIG. 1, the frequency divider 115 causes the scanner servo control and drive 141 and 142 to catch up with the desired speed, which is n times standard speed.

The same principle applies to the tape drive effected by a tape drive capstan 146 driven by a motor 147. The capstan motor 147 is energized by a capstan drive amplifier and servo 148 connected into a servo loop 149 including also a capstan tachometer 151 and the frequency divider 116. As in the case of the servo loop 63 disclosed above in connection with FIG. 1, the frequency divider 116 causes the capstan and thereby the tape advance to catch up with the desired speed, which is the selected multiple of the standard speed.

The increased frequency, nf, produced, for instance, by the oscillator 71 shown in FIG. 1, is also used via leads 154 and 155 to control the operation of the luminance and chrominance signal processors, as well as head switching functions shown, for simplicity, as incorporated in the video and audio recording amplifiers 118 and 123. Conversely, the divided-down frequency, f, produced, for instance by frequency division at 72 in FIG. 1, is employed also in FIG. 2 to control the scanner and capstan drive servoes 142 and 148.

On the other hand, the increased synchronization frequency, nf, is employed according to the preferred embodiment shown in FIG. 2 for generating the control track signal. In particular, a control signal recording head 161 records the control signal in the track 108 of the tape during the record mode, so as to enable the recorded pattern of slant tracks 102 to be traced during subsequent playback. The control signal generator 162 may derive information from the scanner servo 142 and may drive the reference signal recording head 161 in a conventional manner, except that the reference signal recorded in the track 108 is derived from the higher frequency synchronization signal, nf, rather than from the lower frequency, f.

The video recordings thus produced are suitable for playback by conventional equipment at standard speed. In principle, the several recording apparatus 96, 97, and 98 may be identical or alternatively may be different, as required for given tasks. In FIG. 2, the video recorders 96 to 98 are shown as connected in parallel with respect to the video, audio, increased synchronization frequency and standard synchronization frequency inputs.

FIGS. 2 and 3 show the recorded tape 103 applied to a standard video tape or cassette playback machine 165 in the home or at another location 166 of a first viewer. This illustrates the flow of video information from the duplication facility to the equipment of individual viewers. However, in practice, there typically will be at least one intermediate step in such video information flow. For instance, the recorder 96 in the duplication facility typically will have tape supply and takeup reels and reel servoes, such as those symbolically shown in FIG. 1 at 34 and 35 for the playback machine 31. On the other hand, if the information is rerecorded on such media as video disks, there will be no tape reels. The upper portion of FIGS. 2 and 3 showing the medium 103 as running from duplication facility to individual viewer thus illustrates a general case. However, there practically will be some packaging involved in the video information channel between duplicator and distributor of duplicated video recordings.

For instance, FIG. 3 shows a cassette loader 169 which, in practice, may well belong to the duplicating facility shown in FIG. 2, or which may be a separate or spaced operation. Cassette loading apparatus have been described in U.S. Pat. No. 4,512,527, by George D. Rehklau et al, issued Apr. 23, 1985 and referring to further information in that area.

Duplicated tapes, including the rerecorded tape 104, may thus be loaded into video cassettes 171, for sales to, and replay by individual viewers in standard video cassette recorders with playback facility. In principle, a video cassette playback apparatus would be sufficient for that purpose, but most viewers likely will prefer having a video cassette apparatus capable of recording as well. Accordingly, FIG. 3 broadly shows a standard video cassette recorder 172, for replay of the rerecorded video information at a viewer's location or home 174. For viewers having video tape recorders 175 using tape reels without cassettes, a tape loader 176 may be employed for loading duplicated tapes, such as the tape 105 on reels for supply to consumers, as indicated by dotted lines 178 in FIG. 3.

The video information channel from producer to viewers thus includes branches reaching into individual homes or to several viewer locations 166, 174 and 179. The subject invention liberates such communication channels from a bottleneck which heretofor impeded achievement of their full potential.

It certainly is significant in this respect that others who have tried to remedy that bottleneck have in effect degraded the information, as shown above, and thus have degraded, rather than augmented any transmission channel that could have been provided by intensive video information duplication.

As shown in FIG. 3, the rerecorded video information is replayed by several viewers, symbolized by different viewer locations 166, 174 and 179. The rerecorded video information is thus replayed at different times from the several recording media 103, 104, 105, etc. at standard speed. In this manner, the subject invention avoids the serious impairment of the communication channel that would result from any requirement that viewers purchase non-standard equipment for viewing the duplicated video information.

Conventional video monitors or television sets 181, 182 and 183 may be employed for viewing the video action, including the entertainer 12 playing the instrument 14. Dual loudspeaker systems 185 and 186 may, for instance, be employed for reproducing the sound accompaniment 13 sterophonically. Monaural reproduction is of course, also possible, such as via a loudspeaker 187.

Looking again at the area 10 of FIG. 1, video information is recorded on the first recording medium 21 at the standard speed and in the standard format with the aid of first synchronization signals having standard synchronization frequencies, f. The duplication facility according to the preferred embodiment of the subject invention illustrated in FIGS. 1 et seq. then provides, such as with an oscillator 71, second synchronization signals having frequencies, nf, increased by a multiple relative to the standard synchronization frequencies. That multiple is the factor n by which the speed of the duplication process is increased over the standard speed at which the video recording 19 was made at 10. Alternatively, the multiple may be the factor by which the frequenncy nf is higher than the standard frequency f, and the increased speed of the reproduction and simultaneous rerecording processes then corresponds to such increased synchronization frequencies, nf.

In either case, the electric signals reproduced by the playback process in the duplication facility, such as at 31, are processed with the second synchronization signals having the increased frequencies nf, such as shown at 74 and 88 in FIG. 1, and also at 109 and 110 in FIG. 2. The rerecording of the video information reproduced at 31 is then effected from the processed electric signals, such as shown at 118, 121, and 122 in FIG. 2.

Also within the scope of the currently discussed aspect of the invention, or of the illustrated preferred embodiment, there are derived, from the second synchronization signals having the increased frequencies nf, third synchronization signals having the standard frequencies f, as shown, for instance, at 72 in FIG. 1. According to this aspect of the invention or of the illustrated preferred embodiment, reproduction and rerecording of the video information are then synchronized with the third synchronization signals, such as shown at 53, 59, 97, 98, 142 and 148 in FIGS. 1 and 2.

In particular, the illustrated preferred embodiment provides servo systems 53, 59, 142 and 148 for synchronizing the reproduction and rerecording at 31 and 96, and effect synchronization of such reproduction and rerecording with the servo systems in response to the third synchronization signals having standard frequency f, even though multiple synchronization frequencies nf are generated and otherwise employed in the reproduction and rerecording process.

Where rotary components are employed for effecting the reproduction and rerecording, such as with the rotating components 41, 42, 48, 121, 122, and 146, tachometer signals are generated in response to operation of such rotary components, such as in the manner shown at 55, 61, 143, and 151 in FIGS. 1 and 2.

According to the illustrated preferred embodiment, a rate of these tachometer signals is diminished by a divisor corresponding to the above mentioned multiple. In practice, this may be accomplished by dividing tachometer output frequencies by the above mentioned factor of n, as shown by way of example at 56, 62, 115 and 116 in FIGS. 1 and 2, and also at 67 in FIG. 1 for the synchronization signals in the phase lock loop 65.

Where servo systems are provided for synchronizing reproduction and rerecording, the illustrated preferred embodiment effects such synchronization of the reproduction and rerecording processes with such servo systems 54, 63, 65, 145, and 149 in response to the tachometer signals at the diminished rate, $\div$ by n, and in response to the third synchronization signals of standard frequencies f. In this respect, and also with respect to the increased frequency, the symbol f is intended to cover all vertical, horizontal and other required synchronization frequencies of signals employed in the synchronization of the reproduction and rerecording processes.

Where the first recording medium is a first tape, such as shown at 21 in FIG. 1, having the video information 19 stored therein, and the second recording media comprise second tapes 103, 104 and 105 for receiving the duplicated video information, the reproduction of video information includes moving the first tape 21 and moving reproducing means, such as the rotary playback heads 41 and 42, relative to that moving first tape for reproducing the video information in the form of electric signals, as shown at 31 in FIG. 1.

The rerecording of reproduced video information then includes moving the second tapes 103, 104 and 105 and moving recording means, such as rotary recording heads 121 and 122, relative to the moving second tapes for simultaneously rerecording the reproduced video information from the electric signals derived at 91 onto the second tapes.

In cases of the latter kind, the illustrated preferred embodiment of the invention records the video information on the first tape 21 at the standard speed and in the standard format with the aid of first synchronization signals having standard synchronization frequencies, as mentioned above with respect to the video tape recorder 18 at 10. This aspect of the illustrated preferred embodiment provides second synchronization signals, such as shown at 71 in FIG. 1, having frequencies increased by the multiple n relative to the standard synchronization frequencies f. Electric signals containing video information reproduced by the moving reproducing means, such as the rotating heads 41 and 42, are then processed with the second synchronization signals, nf, while third synchronization signals having standard frequencies f are derived from such second synchronization signals having the increased frequencies nf.

The reproduced video information is rerecorded from the electric signals processed, such as at 91 with moving recording means, such as rotating heads 121 and 122, on the moving second tapes 103, 104 and 105. If the video information includes a sound accompaniment, such audio may also be recorded by moving recording means, such as the audio heads 125 and 126 shown in FIG. 2, or by stationary audio heads.

The third signals, f, are then employed for synchronizing movement of the reproducing means 41 and 42 relative to the moving first tape 21 and the movement of the recording means 121 and 122, with or without audio heads 125 and 126, relative to the moving second tapes 103, 104 and 105.

FIG. 5 shows a system 200 according to the preferred embodiment of the subject invention for processing the reproduced electric signals jointly for the rerecording processes on the several second recording media 103, 104, 105, etc.

According to FIG. 5, a master playback system 201 is followed by a rerecording control 202. That master playback system includes a reproducing facility, such as the playback apparatus 31 shown in FIG. 1, from which information from the series of slanted tracks 22 on the first recording medium 19 is reproduced in the form of electric signals seriatim at the increased speed, n. As in FIG. 1, the playback apparatus 31 typically is equipped with time base correction and related video signal handling and processing equipment 74 for supplying a line 204 with stable audio-accompanied synchronized video signals corresponding to the information recorded on the master tape 19.

Typically, the master playback system 201 includes at least one further playback apparatus 231, equipped with signal correction circuitry 274, for supplying a further line 205 with stable audio-accompanied synchronized electric signals corresponding to information recorded on a further master tape 219. That further master tape may correspond to the master tape shown in FIG. 1 and may also include video or other information recorded at standard speed and in a standard format in a series of tracks slanted relative to a direction of movement of that master tape 219.

If desired, the second playback apparatus 231 and its signal handling and processing circuitry 274 may correspond or even be identical to the playback apparatus 31 and circuitry 74, 80 shown in FIG. 1 and explained above. If desired, the apparatus 231 with circuitry 274 may be provided for reproducing information from a master tape 219 on which information was recorded in a format different from that used in recording the information on the first master tape 19. In practice, this may also apply to the recording, reproduction and rerecording of any audio accompaniment or information, with one audio system being, for instance, used for the master tape 19 and playback apparatus 31, and another audio/video system being used for the second master tape 219 and playback apparatus 231. Reference may in this respect be had to the above mentioned SMPTE article by Shiraishi, and it is, of course, understood that any playback apparatus will be provided with such equipment as required to reproduce also the particular audio accompaniment. Further information on the advanced technique of HD sound dubbing may, for instance, be obtained from the above mentioned National/Panasonic Training Manual No. VRD-8510-232.

The lines 204 and 205 apply the played-back sound-accompanied synchronized video signals to a matrix switcher and signal router 206 which handles and directs the various played-back video, audio, synchronization control and system control signals. For instance, in the case of video signals with stereophonic sound accompaniments, the matrix switcher 206 applies the video signal, V, the left channel audio signal, Lf, and the right channel audio signal, Rt, to a line 208 which, in turn, applies the signals as shown in FIG. 5.

In particular, the video signal is applied to a video modulator 209 which modulates the video signal for rerecording purposes. By way of example, the video modulator 209 supplies the matrix switcher 206 with a frequency modulated luninance signal via a line 211 and with an amplitude, phase or frequency modulated chrominance signal via a line 212.

Line 208 applies the left channel audio signal, LF, and the right channel audio signal, Rt, separately to a dbx encoder 213 and an audio limiter 214, which may be of conventional types for dynamic range compression.

The encoder 213 may be part of the above mentioned HD sound dubbing system providing stereophonic HIFI sound. That system may also include a dual-channel audio modulator 216 which, in turn, may include the frequency modulators 112 and 113 shown in FIG. 2 and described above for the two stereophonic audio channels. As in the case of the component 123 shown in FIG. 2, the frequency modulated left and right audio channels are applied to a combiner or adder 217 which applies the combined stereophonic audio signals via line 218 to the matrix switcher 206 for subsequent depth or frequency multiplex video and audio recording.

The line 208 also applies the left and right channel stereophonic audio signals via audio limiter 214 to an audio modulator 221 rendering the audio signals suitable for distribution to multiple longitudinal rerecording systems. Standard compression of dynamic range for recording purposes may be provided by a Dolby encoder 222, while a tone generation adder 223 inserts a signal identifying the particular tape or the particular tape section.

In this respect, synchronization control signals serve to preserve the necessary coherence of the rerecording system, to produce standard recordings at 103, 104, 105, etc. System control signals are inserted to indentify the particular tape of particular tape section and are used for quality control, editing and separating a tape with multiple copies of programs into separate cassettes or reels.

The second modulated left channel and right channel audio signals are also applied to the adder 217 for supply via line 218 to the matrix switcher 206 and subsequent recording thereof.

The system 200 also includes a master synchronization signal generator 226 for synchronizing the playback apparatus as indicated by a line 227 and for synchronizing also the rerecording processes via a servo lock generator 228. In practice, that synchronization equipment may include the nf oscillator 71 and the frequency divider, $\div n$, 72 shown in FIG. 1, operating on the scan and capstan servo controls shown in FIGS. 1 and 2. In addition to supplying the lower synchronization signals f to the playback apparatus 31 and 231 via line 227, the master synchronization generator 226 or its local oscillator 71, also supplies via a line 229 the higher synchronization frequencies nf for the signal handling and processing circuits 74 and 274. That principle also applies to the rerecording process, in that a line 230 in FIG. 5 supplies the higher frequency synchronization signals nf to the rerecording process, while a line 232 supplies servo lock synchronization signals at the lower rate f for the rerecording servo lock control.

Such servo control signals drive a servo lock distribution amplifier 234 which, in turn, drives servo circuits 235 for the video recorders 96, 97, 98, etc. Reference may in this respect be had to FIG. 2, including the scanner and capstan servo controls 145 and 149 thereof.

The line 231 supplies the higher synchronization frequencies nf to a control signal generator 162 which, as in FIG. 2, provides for recordation of the control signal in the track 108 or mixed with the tracks 102 of each slave tape via the recording head 161 or heads 121 etc.

The rerecording control 202 includes a block control 237 which, for instance, controls the on-off condition of each machine in a particular block. That block control 237 acts on a machine control 238 for the playback machines 31 and 231 in the master playback system 201, and on a machine control 239 in the rerecording system 241. That machine control 239 may be both remote and local, responding also to an indication when any slave tape has become stuck or is otherwise not advancing or recording properly. To this end, a motion detector 243 generates a signal which is supplied via the tape drive control 244 to the machine control 239 when an intended tape motion is not taking place. The machine control 239, in turn, controls the tape run accordingly via that tape drive control 244.

The machine control 239 and block control 237 may also respond to other trouble related signals such as servo unlock or rerecord signal level errors, signaling various alarms and indicators. Dependent on the magnitude of the error, maintenance or complete stopping of the rerecording process may be required.

The matrix switch 206 applies the played-back luminance signal to a luminance distribution amplifier 246 and the chrominance signal to a chrominance distribution amplifier 247. These distribution amplifiers, in turn, drive a luminance record driver 248 and a chrominance record driver 249 in each rerecording machine 96, 97, 98 etc. In practice, luminance and chrominance signal recording may, of course, be combined for each slave tape 103, 104, 105 etc. as shown, for instance, at 118, 121, and 122 in FIG. 2 for one of the rerecording machines.

The matrix switcher 206 applies the audio information to an audio demodulator 250 which demodulates the left channel and right channel audio signals to baseband for standard linear recording in a well known manner. The audio signals may be recorded via distribution amplifier 251 and linear audio recorder 258 in longitudinal tracks 24 along an edge of any slave tape. The standard circuit for that purpose may also include the customary bias and erase frequency generators 252, and may apply the erase frequency to an erase head 253, for erasing each slave tape before information is recorded thereon.

The modulated audio information is also applied via a low-pass filter 254 to an audio HIFI distribution amplifier 255. The low-pass filter 254 eliminates undesired modulated signal components occurring above 5 MHz provided for longitudinal recording after demodulation thereof.

In this respect, longitudinal recording may be effected by linear audio recording equipment 258 which includes an audio head assembly similar to the assembly 49 shown in FIG. 1. On the other hand, the audio HIFI distribution amplifier 255 drives an audio HIFI record driver 259 in each rerecording machine in which deep layer or frequency multiplex audio signal recording is practiced. As already mentioned in connection with FIG. 2, rotating audio heads 125 and 126 may be employed for that purpose in conjunction with the rotating video heads 121 and 122. Reference may also be had in this respect to the above mentioned SMPTE article and National/Panasonic Training Manual.

The components shown for the rerecording system 241 in FIG. 5 may be duplicated for as many rerecording machines 96, 97, 98, etc., as desired. Accordingly, output signals of the luminance, chrominance, audio and servo lock distribution amplifiers, and of the block control 237 are shown as being applied to loops in the rerecording system 241. However, as indicated by the multiple outputs of the distribution amplifiers in the rerecording control 202, the various distribution amplifier output signals alternatively may be applied in parallel to the different rerecording machines 96, 97, 98, etc. Conventional resistive matrices may be employed for that purpose at the distribution amplifiers.

Economies of scale and other considerations and realities in systems of the subject kind require quality control at every step to remove defective recordings at the earliest possible point and to otherwise exclude any defective tape or cassette as much as humanly possible. In systems according to the subject invention, such quality control can be largely automated.

By way of example, FIG. 5 shows a signal monitor 262 which receives inputs from the servo lock distribution amplifier 234, luminance distribution amplifier 246, chominance distribution amplifier 247 and audio distribution amplifiers 251 and 255 indicating whether such components are operating properly either of themselves or in conjunction with other components. The signal monitor 262 accordingly applies an output signal to the block control 237 for the performance of its above mentioned functions. A similar signal monitor (not shown) may be provided in the system 241 for monitoring the components 162, 235, 248, 249, 252, 253, 258 and 259 therein and for controlling the machine control 239 or even the block control 237 accordingly.

The subject invention may also be employed in conjunction with the apparatus and methods disclosed in U.S. Pat. No. 3,592,977, by James U. Lemke, issued July 13, 1971 for Mirror-Image Magnetic Information Recording Methods, and herewith incorporated by reference herein.

By way of example, the mirror-image type of recording disclosed in that Lemke patent may be employed for rerecording the information reproduced by a master playback machine such as the playback machine at 31 in FIG. 1 hereof. For instance, a Lemke type mirror-image recorder may be used as rerecorder at 98 in FIG. 2. In that case, at least the video information would be recorded on the copy tape 105 in slant tracks representing a mirror image of the tracks which the standard VTR or VCR 175 is able to handle. Accordingly, what has been labeled in FIG. 3 as TAPE LOADER 176 would then actually be or include a tape-to-tape contact copier which produces for the VTR 175 or for any VCR 165 or 172 a right-reading copy, as distinguished from a mirror-image copy.

Anhysteretic, thermal or other static or dynamic processes for making a right-reading copy tape from a mirror-image master or submaster tape are also shown and described in the latter incorporated Lemke patent or have otherwise become well known over the years.

In practice, thousands of copy tapes could be made from a single mirror-image master 105 rerecorded at 98. Such copy tapes could be made at high speeds exceeding the speed of the recording or rerecording process by many times. The resulting right-reading copy tapes would then be suitable for playback with standard VTRs or VCRs 165, 172, 175, etc., at a large number of viewers. Of course, while the broad aspect of the invention includes use of a Lemke-type mirror-image rerecording machine, the practice of the invention is not dependent on such a use. However, pursuant to the principles of the subject invention, any Lemke-type or other mirror-image rerecording machine is run at the higher speed and controlled with the standard and higher synchronization frequencies as disclosed with the aid of FIG. 2 or otherwise within the scope of the invention. While the copying of video information has been emphasized herein, it should be understood that the utility of the invention is not so limited. In this respect, producers have started to put audio information and entertainment in slant tracks on tape for playback with slant-track machines, as if it were video. Very high quality sound recordings can be realized that way and produced in great numbers through duplication according to the subject invention.

Whenever video and/or audio copying speed is doubled, the capacity of the duplication plant is doubled as well. In more general terms, increase of the duplication speed by a factor of n correspondingly decreases the volume required for a duplication plant in which each playback machine serves dozens of rerecorders. The subject invention thus not only multiplies plant output, but at the same time increases the relative quality of the resulting product. It is that proliferation of high-quality copies which gives the whole process the status of a comparable video or other communication channel of its own, since it also decreases price per copy.

When price per tape decreases with increasing quality, the now prevalent tape piracy is effectively discouraged if not successively stopped. This, in turn, encourages producers to release more and more first-class features to the prerecorded tape market.

At the same time, lower prices render expansions into the literary field feasible, whereby high-quality audio visual "books on tape" become affordable for wide segments of the population and for the educational field as well.

Similarly, education and entertainment in the form of games on tape become feasible and affordable through the subject type of rapid high-volume duplication.

Computer programs or other data recorded in slant tracks can also be duplicated at high volume and widely proliferated by the subject invention.

It may be noted in this respect and in general that the subject invention, even as originally disclosed in the parent application, avoided the cumbersome approaches and mistakes of the prior art.

For instance, unlike some prior-art track skipping or information deleting methods, the subject invention reproduces and rerecords the information tracks seriatim without deliberate omission of information tracks. Of course, information reproduced from one recording medium at increased speed may, within the scope of the invention, be rerecorded simultaneously onto several second recording tapes or media at the speed increased relative to the standard speed going with the particular slant track format. In that context, the expression seriatim would still refer to the fact that the tracks are played back and recorded one after another, albeit simultaneously on several tapes or other recording media.

The subject invention also avoids the entrenched prior-art practice of multiplying the playback heads and the rerecording heads relative to the number of playback devices going with the particular slant track format. In this respect it is well known that video recording has been standardized into several slant track formats. Each of these standardized formats is not only correlated to a standard speed for that format, but also to such parameters as a standard number of recording and playback heads, a standard track angle, which may be seen as the angle between each track and an adjacent tape edge, a standard cylinder diameter for the scanner, and a standard scanner tilt angle.

While that has been known for decades, there was an entrenched prejudice in the art that one could not duplicate slant track format video tapes by running the standard number of video heads at relative head and tape speeds significantly higher than a standard speed correlated to the particular standard slant track format or that one would have to multiply the number of playback and recording heads and deviate from other standard parameters.

The subject invention from its inception did away with that prior-art prejudice by not only increasing the duplication speed on the order of a multiple of the standard speed for the particular format, but by also employing only the predetermined number of playback devices which go with the particular slant track format. This number, which is specific to each format, is referred to herein as "predetermined standard number."

Accordingly, FIG. 1 shows only the two recording heads 41 and 42 that are standard for the well-known VHS, Beta, and B-helical scan formats. Of course, pursuant to the teachings of the subject invention, four playback heads would be used for the old transverse scan format for which four heads were standard, as shown, for instance, on page 1258 of the above mentioned SMPTE Journal article by Shiraishi, or three-head and other four-head VTR's as standard in conjunction with each corresponding slant track format shown there.

The standards herein referred to have often been evolved by equipment manufacturers, to be followed up by national and international standardization, by such organizations as the Society of Motion Picture and Television Engineers (SMPTE), the American National Standard Institute (ANSI), the Electronic Industries Association of Japan, The European Broadcast Union (EBU) and the CCIR in Europe.

Within the scope of the subject invention, reproduced video information can be rerecorded on any desired format with a variety of recorders that can operate at the desired multiple of standard speed. Accordingly, the number of rerecording heads at the slave tapes or media may be different from the number of playback heads at the master tape or medium, if the recording format on the slave tapes is different from the master format on the master tape or medium. However, while FIG. 2 shows four recording heads 121, 122, 125 and 126, it should be noted that these still comprise only the two rotating video recording heads 121 and 122 which go with the slant track format shown at 102 in FIG. 2 and, in the illustrated embodiment, at 22 in FIG. 1 for that matter.

Against this background, it should be recalled that the third and fourth rotating heads 125 and 126 are audio recording heads which, as explained above, record the audio accompaniment on the tape 103, with the video signal then being recorded over it by the separate rotating recording heads 121 and 122. Of course, such four rotating recording heads are also standard in the latter newer conventional type of video and audio recording. However, the subject disclosure does not pay much attention to audio recording, since linear audio track duplication at increased speeds with stationary heads has not been affected by the above mentioned prior-art prejudice which has impeded high-speed duplication of information in slant track formats.

Accordingly, the presently discussed aspect of the subject invention may be characterized as an apparatus or method of transmitting information from producer to end users wherein the information is provided on a first recording medium 21 recorded in a series of tracks 22 slanted relative to a direction of movement 23 of the first recording medium in a standard format correlated to a predetermined standard number of playback devices, such as shown at 41 and 42, for reproducing the information from the series of tracks 22 and correlated to a standard speed for reproducing the information from that series of tracks with that predetermined number of playback devices 41 and 42.

According to the currently discussed aspect of the invention, the information is reproduced from the series of tracks 22 on the first recording medium 21 with only the predetermined standard number of playback devices 41 and 42 in the form of electric signals seriatim at increased speed on the order of a multiple, n, of the standard speed which, for instance, may be the speed at which the information has been recorded at 18 in the facility 10 of FIG. 1, or the speed at which information is regularly played back by the standard VCR or VTR 165, 172 and 175 in FIG. 4.

The information reproduced according to FIG. 1 or in a corresponding manner within the scope of the subject invention, is simultaneously rerecorded from the reproduced electric signals seriatim in a standard format with a series of tracks 102 on several second recording media 103, 104 and 105 at the increased speed, n, with recording devices 121 and 122 of only the predetermined standard number for each of the second recording media, for replay of the rerecorded information by several end users at different times from the several recording media 103, 104, 105 at standard speed.

The master tape 21 and/or any one or more of the slave tapes 103, 104 and 105 could be a recording medium other than a recording tape, as long as the principles of the subject invention or equivalents thereof are applied to duplication of information therefrom or thereon. However, the illustrated embodiment of the invention shows at least the second recording media as tapes 103, 104 and 105 for receiving the duplicated information. The rerecording of reproduced information includes moving the tapes 103, 104, 105 and moving the recording devices relative to such moving tapes for simultaneously rerecording the reproduced information from the electric signals with sets of only the predetermined standard number of recording devices, such as shown at 121 etc, but at the increased speed, n, onto the tapes 103, 104, 105, in the standard format apparent at 102 in FIG. 2.

Any standard format herein mentioned is correlated to a predetermined standard track angle of each of the slanted tracks relative to a tape edge. Such track angle is easily seen at 19 in FIG. 1 between each slanted track 22 and the tape edge at 25, for instance. Such track angle is also easily seen in FIG. 2 between each slanted track 102 and the tape edge at 108. In consequence of the prior-art prejudice against employing the approach from which the subject invention proceeds, prior-art tape duplication apparatus changed the track angle thereby eventuating serious problems and necessitating cumbersome corrective measures, as mentioned above in the introduction.

Contrary to such prior-art aberration, the preferred embodiment illustrated in FIG. 2 moves the video recording devices 121 and 122 relative to the tapes 103, 104 and 105 at the predetermined standard track angle for the particular format and at the increased speed, n, for rerecording the information in slanted tracks 102 for the standard format.

As already shown with the aid of FIG. 1, the information is reproduced from the series of tracks 22 on the first recording tape 21 with only the predetermined standard number of playback heads 41 and 42 in the form of electric signals seriatim by moving the first tape and moving the playback heads relative to that moving first tape at increased speed on the order of a multiple, n, of the standard speed. According to FIGS. 1 and 2, this is combined with simultaneously rerecording the reproduced information from the electric signals transmitted via terminals 91 and 92 seriatim in a standard format with series of tracks 102 on several second recording tapes 103, 104, 105 with recording heads, such as 121 and 122, of only the predetermined standard number for each of the second recording tapes by moving such second tapes and moving the recording heads relative to such moving second tapes at the increased speed, n, for replay of the rerecorded information by several end users at different times from the several media at standard speed, such as illustrated in FIG. 3.

Unlike prior-art apparatus which found it necessary to change the track angle, the playback heads 41 and 42 are moved relative to the first tape 21 at the predetermined standard track angle and at the increased speed, n, along the series of tracks 22 on the first recording tape for the reproduction of the information 19, and the recording heads according to FIG. 2 are moved relative to the second tapes 103, 104, 105 at the predetermined standard track angle and at the increased speed, n, for rerecording of the information in slanted tracks 102 for the standard format shown at 107.

As shown and explained above with the aid of FIG. 1, the predetermined standard number of playback heads 41 and 42 is rotated about a first axis 43 at an increased speed of rotation corresponding to the multiple, n, of the standard speed. The first tape 21 is wrapped about a first cylinder 36 having that first axis 43 for movement of the playback heads 41 and 42 relative to the first tape in a manner correlated to the standard format shown at 19 in the insert 10 of FIG. 1.

Unlike the above mentioned prior art duplication systems that found it necessary to change the scanner cylinder diameter, the illustrated preferred embodiment of the invention maintains or provides the cylinder 36 at a predetermined standard cylinder diameter correlated to the standard format, and rotates the playback heads 41 and 42 about the first axis 43 at increased speed of rotation, n, while the first tape 21 is advanced about that first cylinder 36 of standard cylinder diameter at an increased speed corresponding to the multiple of the standard speed for reproducing information for the first tape. Each set of the predetermined standard number of recording heads is rotated about the second axis at an increased speed of rotation corresponding to the multiple, n, of the standard speed. As already mentioned above, the apparatus shown in FIG. 1 at 31 may also be employed for rerecording at 96, 97 and 98 in FIG. 2, whereby the axis of recording head rotation would be like the axis 43 for the playback heads and scanner shown in FIG. 1. Accordingly, the axis 43 of FIG. 1 may be taken as the axis of rotation of the scanner 138 in FIG. 2. If an explicit symbolic showing is desired, then the arrow extending from the scanner motor 141 to the scanner 138 may be taken as the showing of an axis of rotation, inasmuch as the axis of rotation of the scanner motor is the axis of rotation of the scanner and of the recording heads as well. The familiar grounding symbols (a dash with several slanted lines) may be thought at each head and axis as signifying maintenance of the standard parameters herein taught for high-speed operation.

At any rate, each set of the predetermined standard number of recording heads is rotated about that second axis at an increased speed of rotation corresponding to the multiple, n, of the standard speed. Each of the second tapes 103, etc., is wrapped about a second cylinder 136 having the second axis for movement of the recording heads 121, etc., relative to the second tapes 103, etc., in a manner correlated to that standard format, such as in the manner shown in FIG. 1 for the scanner 31, for instance.

The second cylinder 136 is provided at the predetermined standard cylinder diameter correlated to the standard format, and the recording heads 121, etc., are rotated about the second axis at the increased speed of rotation while each tape 103, etc., is advanced about that second cylinder 136 of standard cylinder diameter at an increased speed corresponding to the multiple of the standard speed for rerecording the reproduced information onto these tapes 103, 104, 105, in the standard format suitable for playback with standard VCR's or VTR's 165, 172, 175.

According to standard practice in the industry, each standard format is correlated to a standard relative tilt angle of the scanner axis. According to the illustrated preferred embodiment of the invention that axis is maintained at the standard relative tilt angle during duplication of the information at the increased speed, n. For instance, the first and second axes shown at 43 in FIG. 1 and between the motor 141 and scanner 138 in FIG. 2 are maintained at their standard relative tilt angle during reproduction of the information with the rotated heads from the series of tracks 22 on the first recording head 21, and during rerecording of the reproduced information with the recording heads onto the second tapes 103 in the standard format seen at 107 in FIG. 2. In FIG. 1, the axis of rotation 43 appears as a vertical line. However, this is only a symbolic showing that may represent another tilt angle. Indeed, the line between motor 141 and scanner 138 in FIG. 2 is tilted as shown in FIG. 2.

At any rate, the preferred illustrated embodiment of the invention maintains the scanner angle at its standard tilt corresponding to the particular standard format employed, even though the scanner speed is a multiple of the corresponding standard speed.

Moreover, unlike the prior-art apparatus which found it necessary to mount the heads on piezoelectric devices in order to correct their course vertically in an effort to compensate for the consequences of multiplying the number of heads, the illustrated preferred embodiment of the subject invention maintains the playback heads axially stationary in either direction of the first axis 43, as symbolically indicated in FIG. 1 by interconnecting the playback heads 41 and 42 with their axis of rotation 43. That showing of the playback heads symbolizes the fact that such heads 41 and 42, while rotating about the axis 43, are actually located diametrically opposite of each other on the headwheel 39 as mentioned above. The point here is that the playback heads 41 and 42 are not vertically movable for corrective purposes during their scanning rotation, but are rather rigidly attached to the headwheel 39 against vertical movement in either direction of the axis 43 during their rotation. Accordingly, apart from possible conventional initial and occasional adjustments, the playback heads 41 and 42 are rigidly mounted on the headwheel 39 for and during their scanning function.

This applies also to the recording heads used for rerecording information, such as in FIG. 2, where the heads 121 to 126 are also shown inserted into the otherwise circular showing of a scanner wheel 136, to symbolize the fact that the recording heads are rigidly attached to the headwheel 136 during the rerecording process of the information reproduced from the master tape or medium. Again, this is contrary to the prior art approach that would mount the recording heads on piezoelectric devices for continual adjustment of their position in the direction of the axis of rotation.

The drawings with the aid of FIG. 3 also show apparatus and a method of transmitting information from producer to end users without deliberate omission of information tracks, wherein the information is provided on a recording medium for ultimate playback at a standard speed from a standard format in a series of tracks slanted relative to the direction of movement of the recording medium.

That principle may be applied to the duplication system with or without cassette loader 169 or equivalent facility.

The combination of high-speed duplication with high-speed cassette loading has brought about a great leap forward in making the video cassette a true medium for transmitting information from producer to end users. While this will benefit also other areas where tape and other recordings can become a medium of rapid transmission of information from producer to end users, one big bottleneck that has impeded the tape or disk from becoming an information conveyance medium equivalent to "over the air" and cable transmission, has become increasingly apparent in the prerecorded video cassette market.

In particular, there always is a risk that a duplicated video feature may not find favor in the market place. Accordingly, duplicating facilities and distributors always stand the risk of being left with hundreds or even thousands of unsold units (video cassettes with unsaleable features recorded therein). On the other hand, if a video feature sells well, lack of a supply of video cassettes containing that feature can be very damaging to business, if not fatal in the long run. Accordingly, conventional real time duplicating companies just have to take the risk that some of their duplicated video features may become unsaleable.

This risk is considerably reduced if high-speed duplication can be employed. In that case, the duplicating company can start out with a much lower number of video cassettes for any given video feature. If that feature then does not go well, the duplicating company has not lost much. On the other hand, if the particular feature sells well, the duplicating company can quickly satisfy an increasing demand by duplication at the increased speed.

Such an advantage is enhanced by employing the high-speed cassette loader 169 or the tape loader 176 shown in FIG. 3 and discussed above in conjunction with a high-speed duplication process herein disclosed or mentioned. Suitable video cassette loading equipment is being manufactured by King Instrument Corporation, Otari Corporation (e.g. Model T-301), Tapematic Corporation (e.g. Model 3000), Tape Automation Limited, and Shape Systems Design.

According to the illustrated preferred embodiment, video features can now be duplicated at high speed on bulk tape on reels, known as "pancakes" in the trade. Program-length or feature-length sections of that bulk tape 104 are then loaded into empty video cassettes 171, as shown at 169 in FIG. 3, and the market can be tested therewith. If the particular video feature does not sell well, it is simply erased from the remainder of the bulk tape, and high-speed duplication can then be employed to quickly record another feature on that bulk tape.

In this respect, the currently discussed aspect of the invention again takes the information provided on a recording medium 21 for ultimate playback at a standard speed from a standard format in a series of tracks 102 slanted relative to a direction of movement of the recording medium 104, such as at 174 in FIG. 3, and first reproduces that information without deliberate omission of information tracks in the form of electric signals seriatim from the series of tracks 22 on recording medium 21 or from another master record at increased speed on the order of a multiple of said standard speed, such as discussed in connection with FIG. 1.

The invention then simultaneously rerecords that reproduced information from the electric signals seriatim in standard format with series of tracks 103 on bulk tape 103, 104, 105, at the increased speed, such as in the manner discussed above in connection with FIG. 2.

The currently discussed aspect of the invention subsequently loads at least part of that bulk tape in the form of program-length tape sections having the reproduced information rerecorded thereon into cassettes for replay of that rerecorded information by several end users at different times from the loaded cassettes at standard speed. The cassette loader 169 may be employed for that purpose, and the illustrated cassette 171 is illustrative of a multitude of cassettes, cartridges or reels (herein broadly called "cassettes") that may be loaded with program-length or feature-length bulk tape sections by one or more high-speed cassette or tape loaders 169 and 176.

Preferably, only part of said bulk tape in the form of said feature-length tape sections having said reproduced information rerecorded thereon is loaded into cassettes and the remainder of said bulk tape, having the reproduced information rerecorded thereon, is stored on a standby basis, as shown at 304 in FIG. 3.

The market may then be tested with that loaded part; that is, with the thus loaded cassettes. If the feature does not sell well (known as "flop" in the trade), the rerecorded information is erased from the stored remainder of the bulk tape, as shown by the block E at 305 in FIG. 3. Bulk eddy current erasure may be employed for that purpose, and the duplication company has not lost much, since the erased bulk tape can then be used again by recording other information on that remainder of that bulk tape.

On the other hand, a combination of rapid procedures can be employed to satisfy increasing demand quickly, if the feature does sell well. In that case the remaining bulk tape with the successful feature recorded thereon is quickly cut up into sections, each containing a full feature, which are then rapidly loaded into empty cassettes with available high-speed machinery.

In terms of the illustrated embodiment of the invention, the remainder of the prerecorded bulk tape may also be loaded into further cassettes, such as shown by the line 306 in FIG. 3, for replay of the recorded information from such further cassettes at standard speed in the form of program-length tape sections having the reproduced information rerecorded thereon, as shown in FIGS. 2 and 3. While that is going on, the successful feature is duplicated onto more bulk tape ("pancakes") at high duplicating speed, and automated machinery is employed to load full-feature sections of that recorded bulk tape into more video cassettes.

This drastically narrows the gap between the risk of producing too much and the risk of having not enough. The higher yield provided by the high-speed duplication encourages higher capital investment. Accordingly, duplicators are encouraged to go for high output volumes in their planning and to provide for the kind of capital investment necessary for a truly high-speed operation, not only in terms of duplication, but also in terms of loading of duplicated tape sections into empty video cassettes with high speed automated machinery.

The ultimate beneficiary of the process according to the subject aspect of the invention will be the public, who will receive video features at more affordable prices. The video cassette thus will truly become a medium for "transmitting information from producer to end user," in parallel to the existing media of off-the-air television, cable TV, and satellite TV, even though no long-distance transmission lines or channels are involved in the practice of the subject duplicating process.

In particular, the illustrated preferred embodiment of the invention meets further demand for replayable recordings of the information quickly by rapidly reproducing the information from the series of tracks 22 on the recording medium 21 in the form of electric signals seriatim at increased speed on the order of a multiple of said standard speed, such as shown in FIG. 1, by simultaneously rerecording that reproduced information from the electric signals seriatim in a standard format with series of tracks 102 on further bulk tape 104 at the increased speed, such as shown in FIG. 2, and by subsequently loading at least part of that further bulk tape in the form of program-length tape sections having the reproduced information rerecorded thereon into further cassettes 171, such as with the high-speed loader 169, for replay of the rerecorded information by several end users at different times from the further loaded cassettes at standard speed.

Of course, any of the above mentioned features of using only the number of standard recording or playback devices, of recording only in the standard track angle, of using only the standard scanner diameter and tilt (standard with respect to the particular format), and of avoiding the need for continual axial adjustment of the recording or playback devices during scanning, may also be employed in the high-speed duplication process in the very advantageous combination with high-speed tape cassette loading.

Also within the scope of the subject invention, the master for high-speed rerecording in slant tracks may be on a disk or other master recording in which the information is not necessarily recorded in slanted tracks.

In that case, the information is still reproduced in the form of electric signals seratim from the first or master recording medium at increased speed on the order of a multiple of the standard speed at which playback at the end user normally takes place for the particular slant track format in which the information is rerecorded.

However, even if a disk or other non-slant track recording is employed, there still is the above mentioned simultaneous rerecording of the reproduced information from the electric signals seratim in the particular standard format with series of tracks on several second recording media at the increased speed on the order of a multiple of the standard speed, with recording devices of only the predetermined standard number for each of the second recording media, as shown by way of example in FIG. 2, for replay of the rerecorded information by several end users at different times with the predetermined standard number of playback devices as shown in FIG. 3 with reference to FIG. 2. In this respect, the VCR 165 or 172 at the end user may be the same or at least would have the same standard number of heads, used as playback heads, as the heads used as recording heads in the rerecording apparatus of FIG. 2.

It may be recalled in this connection that what is known as a "Video Cassette Recorder" is in fact used as a video cassette playback device at least half if not most of the time. The VCR's 165 and 172 shown in FIG. 4 may thus be considered interchangeable with the video recorders 96 and 97 shown in FIG. 2, except for the highly increased operating speed and facility of the rerecorders 96 to 98 according to the subject invention.

Since the standard format at 102 may within the scope of the subject invention be different from the standard format at 22, it should be pointed out that the number of playback devices at the master reproducing apparatus may in fact be different from the number of recording devices at the rerecording apparatus. In that case it may be said that information is provided on a first recording tape 21 recorded in a series of tracks 22 slanted relative to a direction of movement of the first recording tape in a standard format correlated to a predetermined standard number of playback heads, such as the heads 41 and 42, for reproducing the information from the series of tracks 22, and correlated to a standard speed for reproducing that information from that series of tracks on the first recording tape with that predetermined number of playback devices. In that case, the information, as in FIG. 1, is reproduced from the series of tracks 22 on the first recording tape with only that predetermined standard number of playback heads, e.g. 41 and 42, in the form of electric signals seratim by moving the first tape 21 and moving the playback heads relative to that moving first tape at increased speed on the order of a multiple of the standard speed according to the disclosed invention.

However, also within the scope of the subject invention at least the number of recording heads for rerecording is correlated to the standard format destined for playback at the end users 166, 174, 179.

In particular, there is a simultaneous rerecording of the reproduced information from the electric signals seratim in a standard format, destined for playback at end users, with series of tracks on several second recording tapes with recording heads of only a predetermined number standard for that destined standard format for each of the second recording tapes 103, 104, 105, by moving such second tapes and moving the recording heads 121, etc., relative to such moving second tapes at the increased speed herein disclosed, for replay of such rerecorded information by several end users 166, 174, 179 at different times from the several recording tapes at the standard speed, preferably with an intervening high-speed cassette loader 169.

Moreover, the subject extensive disclosure will render apparent or suggest to those skilled in the art various modifications and variations within the spirit and scope of the invention and of its various aspects and of equivalents thereof.

We claim:

1. In a method of transmitting information from producer to end users without deliberate omission of information tracks, wherein said information is provided on a first recording medium for ultimate playback at a standard speed from a standard format in a series of tracks slanted relative to a direction of movement of the recording medium, with a predetermined standard number of playback heads correlated to said standard format, the improvement comprising in combination the steps of:

reproducing said information in the form of electric signals seriatim from said first recording medium at increased speed on the order of a multiple, n, of said standard speed; and simultaneously rerecording said reproduced information from said electric signals seriatim in said standard format with series of tracks on several second recording media at said increased speed with recording heads of only said predetermined standard number for each of said second recording media, said second recording media being moved at a speed being n times a speed standard for said second recording media in said standard format and said heads being rotated at a speed being n times a head speed standard for said standard format, for replay of said rerecorded information by several end users at different times with said predetermined standard number of playback heads from said several recording media at standard speed.

2. A method as claimed in claim 1, wherein:

said second recording media comprise tapes for receiving said information; and said rerecording of reproduced information includes moving said tapes and moving said recording heads relative to said moving tapes for simultaneously rerecording said reproduced information from said electric signals with sets of only said predetermined standard number of recording heads but at said speed being n times standard head speed, onto said tapes moved at n times a speed standard for said tapes in said standard format.

3. A method as claimed in claim 2, wherein:

said standard format is correlated to a predetermined standard track angle of each of said slanted tracks relative to a tape edge; and said recording heads are moved relative to said tapes at said predetermined standard track angle and at said speed being n times standard head speed, for rerecording of said information in slanted tracks for said standard format.

4. A method as claimed in claim 2, wherein:

each set of said predetermined standard number of recording heads is rotated about an axis at an increased speed of rotation being n times standard head speed;

each of said tapes is wrapped about a cylinder having said axis for movement of said recording heads relative to said tapes in a manner correlated to said standard format;

said cylinder is provided at a predetermined standard cylinder diameter correlated to said standard format; and said recording heads are rotated about said axis at said speed being n times standard head speed while each tape is advanced about said cylinder of said standard cylinder diameter at an increased speed being n times a speed standard for said tapes in said standard format, for rerecording said reproduced information onto said tapes in said standard format.

5. A method as claimed in claim 4, wherein:

said standard format is correlated to a standard relative tilt angle of said axis; and said axis is maintained at said standard relative tilt angle during rerecording of said reproduced information onto said tapes in said standard format.

6. A method as claimed in claim 2, wherein:

each set of said predetermined standard number of recording heads is rotated about an axis at an increased speed of rotation being n times standard head speed;

said axis of rotation has a predetermined standard tilt correlated to said standard format;

each of said tapes is wrapped about a cylinder having said axis for movement of said recording heads relative to said tapes in a manner correlated to said standard format; and said recording heads are rotated about said axis at said speed of rotation being n times standard head speed while said axis is maintained at said predetermined standard tilt and while each tape is advanced about said cylinder at an increased speed being n times a speed standard for said tapes in said standard format, for rerecording said reproduced information onto said tapes in said standard format.

7. A method as claimed in claim 2, wherein:

each set of said predetermined standard number of recording heads is rotated about an axis at an increased speed of rotation being n times standard head speed;

each of said tapes is wrapped about a cylinder having said axis for movement of said recording heads relative to said tapes in a manner correlated to said standard format;

said recording heads are rotated about said axis at said speed of rotation being n times standard head speed, while each tape is advanced about said cylinder at an increased speed being n times a speed standard for said tapes in said standard format, for rerecording said reproduced information onto said tapes in said standard format; and said recording heads are maintained axially stationary in either direction of said axis throughout rotation of said recording heads at said speed of rotation being n times standard head speed, for said rerecording of said reproduced information onto said tapes in said standard format.

8. In a method of transmitting information from producer to end users wherein said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, the improvement comprising in combination the steps of:

reproducing said information from said series of tracks on the first recording tape with only said predetermined standard number of playback heads in the form of electric signals seriatim by moving said first tape at a speed being a multiple, n, of a standard tape speed, and moving said playback heads relative to said moving first tape at a speed being n times a standard head speed; and simultaneously rerecording said reproduced information from said electric signals seriatim in a standard format, destined for playback at end users, with series of tracks on several second recording tapes with recording heads of only the predetermined number which is standard for said destined standard format for each of said second recording tapes, by moving said second tapes at a speed being a multiple, n, of a standard tape speed, and moving said recording heads relative to said moving second tapes at an increased speed being n times a standard head speed, for replay of said rerecorded information by several end users at different times from said several recording tapes at standard speed.

9. A method as claimed in claim 8, wherein:

the first-mentioned standard format is correlated to a predetermined standard track angle of each of said slanted tracks relative to a tape edge;

said playback heads are moved relative to said first tape at said predetermined standard track angle and at said speed being n times standard head speed, along said series of tracks on the first recording tape for said reproduction of the information; and said recording heads are moved relative to said second tapes at said predetermined standard track angle standard for said destined standard format, and at said speed being n times standard head speed, for rerecording of said information in slanted tracks for said destined standard format.

10. A method as claimed in claim 8, wherein:

said predetermined standard number of playback heads is rotated about a first axis at an increased speed of rotation being n times standard head speed;

said first tape is wrapped about a first cylinder having said first axis for movement of said playback heads relative to said first tape in a manner correlated to said standard format;

said first cylinder is provided at a predetermined standard cylinder diameter correlated to the first-mentioned standard format;

said playback heads are rotated about said first axis at said increased speed of rotation being n times standard head speed, while said first tape is advanced about said first cylinder of said standard cylinder diameter at an increased speed being a multiple of standard tape speed for reproducing said information from said first tape;

each set of said predetermined standard number of recording heads is rotated about a second axis at an increased speed of rotation being n times standard head speed;

each of said second tapes is wrapped about a second cylinder having said second axis for movement of said recording heads relative to said second tapes in a manner correlated to said standard format;

said second cylinder is provided at a predetermined standard cylinder diameter correlated to said destined standard format; and said recording heads are rotated about said second axis at said increased speed of rotation being n times standard head speed, while each tape is advanced about a second cylinder of the latter standard cylinder diameter at an increased speed being a multiple of standard tape speed for rerecording said reproduced information onto said tapes in said destined standard format.

11. A method as claimed in claim 10, wherein:

each standard format is correlated to a standard relative tilt angle of said first and second axes; and said first and second axes are maintained at said standard relative tilt angle during reproduction of said information with the rotated playback heads from said series of tracks on the first recording tape, and during rerecording of said reproduced information with said recording heads onto said second tapes in said destined standard format.

12. A method as claimed in claim 8, wherein:

said predetermined standard number of playback heads is rotated about a first axis at an increased speed of rotation being n times standard head speed;

said first axis of rotation has a predetermined standard tilt correlated to the first-mentioned standard format;

said first tape is wrapped about a first cylinder having said first axis for movement of said playback heads relative to said first tape in a manner correlated to the first-mentioned standard format;

said playback heads are rotated about said first axis at said increased speed of rotation being n times standard head speed, while said first axis is maintained at said predetermined standard tilt and while said first tape is advanced about said first cylinder at an increased speed being a multiple of standard tape speed for reproducing said information from said first tape;

each set of said predetermined standard number of recording heads is rotated about a second axis at an increased speed of rotation being n times standard head speed;

said second axis of rotation has a predetermined standard tilt correlated to said destined standard format;

each of said second tapes is wrapped about a second cylinder having said second axis for movement of said recording heads relative to said second tapes in a manner correlated to said destined standard format; and said recording heads are rotated about said second axis at said increased speed of rotation being n times standard head speed, while said second axis is maintained at the latter predetermined standard tilt and while each second tape is advanced about a second cylinder at an increased speed being a multiple of standard tape speed for rerecording said reproduced information onto said second tapes in said destined standard format.

13. A method as claimed in claim 8, wherein:

said predetermined standard number of playback heads is rotated about a first axis at an increased speed of rotation being n times standard head speed;

said first tape is wrapped about a first cylinder having said first axis for movement of said playback heads relative to said first tape in a manner correlated to the first-mentioned standard format;

said playback heads are rotated about said first axis at said increased speed of rotation being n times standard head speed, while said first tape is advanced about said first cylinder at an increased speed being a multiple of standard tape speed for reproducing said information from said first tape;

said playback heads are maintained axially stationary in either direction of said first axis throughout rotation of said playback heads at said increased speed of rotation being n times standard head speed, for said reproducing of information from said first tape;

each set of said predetermined standard number of recording heads is rotated about a second axis at an increased speed of rotation being n times standard head speed;

each of said second tapes is wrapped about a second cylinder having said second axis for movement of said recording heads relative to said second tapes in a manner correlated to said destined standard format;

said recording heads are rotated about said second axis at said increased speed of rotation being n times standard head speed, while each second tape is advanced about a second cylinder at an increased speed being a multiple of standard tape speed for rerecording said reproduced information onto said second tapes in said destined standard format; and said recording heads are maintained axially stationary in either direction of said second axis throughout rotation of said recording heads at said increased speed of rotation being n times standard head speed, for said rerecording of said reproduced information onto said second tapes in said destined standard format.

14. In a method of transmitting information from producer to end users without deliberate omission of information tracks, wherein said information is provided on a recording medium for ultimate playback at a standard speed from a standard format in a series of tracks slanted relative to a direction of movement of the recording medium, the improvement comprising in combination the steps of:

reproducing said information in the form of electric signals seriatim from said recording medium at increased speed on the order of a multiple of said standard speed;

simultaneously rerecording said reproduced information from said electric signals seriatim in said standard format with series of tracks on bulk tape at said increased speed; and subsequently loading at least part of said bulk tape in the form of program-length tape sections having said reproduced information rerecorded thereon into cassettes for replay of said rerecorded information by several end users at different times from the loaded cassettes at standard speed.

15. A method as claimed in claim 14, including the steps of:

loading only part of said bulk tape in the form of said feature-length tape sections having said reproduced information rerecorded thereon into cassettes; and storing the remainder of said bulk tape, having said reproduced information rerecorded thereon, on a standby basis.

16. A method as claimed in claim 15, including the steps of:
loading also the remainder of said bulk tape into further cassettes for replay of said recorded information from the further cassettes at standard speed in the form of program-length tape sections having said reproduced information rerecorded thereon.

17. A method as claimed in claim 15, including the step of:
erasing said rerecorded information from said remainder of the bulk tape.

18. A method as claimed in claim 17, including the step of:
recording other information on said remainder of the bulk tape.

19. A method as claimed in claim 14, including the steps of:
meeting further demand for replayable recordings of said information quickly by:
rapidly reproducing said information from said series of tracks on the recording medium in the form of electric signals seriatim at increased speed on the order of a multiple of said standard speed;
simultaneously rerecording said reproduced information from said electric signals seriatim in a standard format with series of tracks on further bulk tape at said increased speed; and
subsequently loading at least part of said further bulk tape in the form of program-length tape sections having said reproduced information rerecorded thereon into further cassettes for replay of said rerecorded information by several end users at different times from the further loaded cassettes at standard speed.

20. A method as claimed in claim 14, wherein:
said standard format is correlated to a predetermined standard number of recording heads for recording information in said series of tracks at said standard speed; and
only said predetermined standard number of recording heads is employed per bulk video tape for simultaneously rerecording said reproduced information from said electric signals seriatim in a standard format with series of tracks at said increased speed, said bulk tape being moved at a speed being n times a speed standard for said tape in a standard format and said heads being rotated at a speed being n times a head speed standard for said standard format, with n being a multiple.

21. A method as claimed in claim 20, wherein:
said standard format is correlated to a predetermined standard track angle of each of said slanted tracks relative to a bulk tape edge; and
said recording heads are moved relative to bulk tape at said predetermined standard track angle and at said speed being n times standard head speed, for rerecording of said information in slanted tracks for said standard format.

22. A method as claimed in claim 20, wherein:
each set of said predetermined standard number of recording heads is rotated about an axis at an increased speed of rotation being n times standard head speed;
each of said tapes is wrapped about a cylinder having said axis for movement of said recording heads relative to said tapes in a manner correlated to said standard format;
said cylinder is provided at a predetermined standard cylinder diameter correlated to said standard format; and
said recording heads are rotated about said axis at said increased speed of rotation being n times standard head speed, while each tape is advanced about said cylinder of said standard cylinder diameter at an increased speed being n times a speed standard for said bulk tape in said standard format, for rerecording said reproduced information onto said tapes in said standard format.

23. A method as claimed in claim 22, wherein:
said standard format is correlated to a standard relative tilt angle of said axis; and
said axis is maintained at said standard relative tilt angle during rerecording of said reproduced information onto bulk tape in said standard format.

24. A method as claimed in claim 20, wherein:
each set of said predetermined standard number of recording heads is rotated about an axis at an increased speed of rotation being n times standard head speed;
said axis of rotation has a predetermined standard tilt correlated to said standard format;
each bulk tape is wrapped about a cylinder having said axis for movement of said recording heads relative to that bulk tape in a manner correlated to said standard format; and
said recording heads are rotated about said axis at said increased speed of rotation being n times standard head speed while said axis is maintained at said predetermined standard tilt and while the bulk tape is advanced about said cylinder at an increased speed being n times a speed standard for said tapes in said standard format for rerecording said reproduced information in said standard format.

25. A method as claimed in claim 20, wherein:
each set of said predetermined standard number of recording heads is rotated about an axis at an increased speed of rotation being n times standard head speed;
each bulk tape is wrapped about a cylinder having said axis for movement of said recording heads relative to that bulk tape in a manner correlated to said standard format;
said recording heads are rotated about said axis at said increased speed of rotation being n times standard head speed, while the bulk tape is advanced about said cylinder at an increased speed being n times a speed standard for said bulk tape in said standard format, for rerecording said reproduced information in said standard format; and
said recording heads are maintained axially stationary in either direction of said axis throughout rotation of said recording heads at said increased speed of rotation being n times standard head speed, for speed rerecording of said reproduced information in said standard format.

26. A method as claimed in claim 14, wherein:
said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads;

only said predetermined standard number of playback heads are employed for reproducing said information from said series of tracks on the first recording tape in the form of electric signals seriatim by moving said first tape at a speed being n times a speed standard for said first tape in said standard format and moving said playback heads relative to said moving first tape at a speed being n times a head speed standard for said standard format; and only said predetermined standard number of recording heads are employed per bulk video tape for simultaneously rerecording said reproduced information from said electric signals seriatim in a standard format with series of tracks by moving the bulk tape at a speed being n times a speed standard for said bulk tape in said standard format and moving said recording heads relative to the moving bulk tape at a speed being n times the head speed standard for said standard format, with n being a multiple.

27. In a method of duplicating information recorded on a first recording medium at standard speed with the aid of first synchronization signals having standard synchronization frequencies, the improvement comprising in combination the steps of:

generating second synchronization signals having increased frequencies on the order of a multiple of said standard synchronization frequencies;

reproducing said recorded information from said first recording medium in the form of electric signals at increased speed corresponding to said increased synchronization frequencies;

processing said reproduced information in the form of said electric signals with said second synchronization signals having said increased frequencies;

deriving from said second synchronization signals having said increased frequencies third synchronization signals having said standard synchronization frequencies;

simultaneously rerecording said reproduced information from said processed electric signals on several second recording media at said increased speed, for replay of said rerecorded information by several users at different times from said several recording media at said standard speed; and synchronizing said reproduction and rerecording with said third synchronization signals.

28. A method as claimed in claim 27, including the steps of:

providing servo systems for synchronizing said reproduction and rerecording; and effecting synchronization of said reproduction and rerecording with said servo systems in response to said third synchronization signals.

29. A method as claimed in claim 27, including the steps of:

providing rotary components for effecting said reproduction and rerecording;

generating tachometer signals in response to operation of said rotary components;

diminishing a rate of said tachometer signals by a divisor corresponding to said multiple;

providing servo systems for synchronizing said reproduction and rerecording; and effecting synchronization of said reproduction and rerecording with said servo systems in response to the tachometer signals at said diminished rate and in response to said third synchronization signals.

30. A method as claimed in claim 27, wherein:

said first recording medium is a first tape having said information stored thereon;

said second recording media comprise second tapes for receiving said information;

said reproducing of information includes moving said first tape and moving reproducing means relative to said moving first tape for reproducing said information in the form of said electric signals;

said rerecording of reproduced information includes moving said second tapes and moving recording means relative to said moving second tapes for simultaneously rerecording said reproduced information from said electric signals onto said second tapes; and said synchronization includes synchronizing with said third signals said moving reproducing means relative to said moving first tape and said moving recording means relative to said moving second tapes.

31. Records of information fixed in tangible media for replay by several end users at different times and at a standard speed, with said information having been provided on a first recording medium for ultimate playback at a standard speed from a standard format in a series of tracks slanted relative to a direction of movement of the recording medium, with a predetermined standard number of playback heads correlated to said standard format, said records produced by a method comprising in combination the steps of:

reproducing said information in the form of electric signals seriatim from said first recording medium at increased speed on the order of a multiple, n, of said standard speed; and simultaneously rerecording said reproduced information from said electric signals seriatim in said standard format with series of tracks on several second recording media at said increased speed with recording heads of only said predetermined standard number for each of said second recording media, said second recording media being moved at a speed being n times a speed standard for said second recording media in said standard format and said heads being rotated at a speed being n times a head speed standard for said standard format, for replay of said rerecorded information by several end users at different times with said predetermined standard number of playback heads from said several recording media at standard speed.

32. Records as claimed in claim 31, where in said method:

said second recording media comprise tapes for receiving said information; and said rerecording of reproduced information includes moving said tapes and moving said recording heads relative to said moving tapes for simultaneoulsy rerecording said reproduced information from said electric signals with sets of only said predetermined standard number of recording heads but at said speed being n times standard head speed, onto said tapes moved at n times a speed standard for said tapes in said standard format.

33. Records as claimed in claim 32, where in said method:

said standard format is correlated to a predetermined standard track angle of each of said slanted tracks relative to a tape edge; and said recording heads are moved relative to said tapes at said predetermined standard track angle and at said speed being n times standard head speed, for rerecording of said information in slanted tracks for said standard format.

34. Records as claimed in claim 32, where in said method:

each set of said predetermined standard number of recording heads is rotated about an axis at an increased speed of rotation being n times standard head speed;

each of said tapes is wrapped about a cylinder having said axis for movement of said recording heads relative to said tapes in a manner correlated to said standard format;

said cylinder is provided at a predetermined standard cylinder diameter correlated to said standard format; and said recording heads are rotated about said axis at said speed being n times standard head speed while each tape is advanced about said cylinder of said standard cylinder diameter at an increased speed being n times a speed standard for said tapes in said standard format, for rerecording said reproduced information onto said tapes in said standard format.

35. Records as claimed in claim 34, where in said method:

said standard format is correlated to a standard relative tilt angle of said axis; and said axis is maintained at said standard relative tilt angle during rerecording of said reproduced information onto said tapes in said standard format.

36. Records as claimed in claim 32, where in said method:

each set of said predetermined standard number of recording heads is rotated about an axis at an increased speed of rotation being n times standard head speed;

said axis of rotation has a predetermined standard tilt correlated to said standard format;

each of said tapes is wrapped about a cylinder having said axis for movement of said recording heads relative to said tapes in a manner correlated to said standard format; and said recording heads are rotated about said axis at said speed of rotation being n times standard head speed while said axis is maintained at said predetermined standard tilt and while each tape is advanced about said cylinder at an increased speed being n times a speed standard for said tapes in said standard format, for rerecording said reproduced information onto said tapes in said standard format.

37. Records as claimed in claim 32, where in said method:

each set of said predetermined standard number of recording heads is rotated about an axis at an increased speed of rotation being n times standard head speed;

each of said tapes is wrapped about a cylinder having said axis for movement of said recording heads relative to said tapes in a manner correlated to said standard format;

said recording heads are rotated about said axis at said speed of rotation being n times standard head speed, while each tape is advanced about said cylinder at an increased speed being n times a speed standard for said tapes in said standard format, for rerecording said reproduced information onto said tapes in said standard format; and said recording heads are maintained axially stationary in either direction of said axis throughout rotation of said recording heads at said speed of rotation being n times standard head speed, for said rerecording of said reproduced information onto said tapes in said standard format.

38. Records of information fixed in tangible media for replay by several end users at different times and at a standard speed, with said information having been provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, said records produced by a method comprising in combination the steps of:

reproducing said information from said series of tracks on the first recording tape with only said predetermined standard number of playback heads in the form of electric signals seriatim by moving said first tape at a speed being a multiple, n, of a standard tape speed, and moving said playback heads relative to said moving first tape at a speed being n times a standard head speed; and simultaneously rerecording said reproduced information from said electric signals seriatim in a standard format, destined for playback at end users, with series of tracks on several second recording tapes with recording heads of only the predetermined number which is standard for said destined standard format for each of said second recording tapes, by moving said second tapes at a speed being a multiple, n, of a standard tape speed, and moving said recording heads relative to said moving second tapes at an increased speed being n times a standard head speed, for replay of said rerecorded information by several end users at different times from said several recording tapes at standard speed.

39. Records as claimed in claim 38, where in said method:

the first-mentioned standard format is correlated to a predetermined standard track angle of each of said slanted tracks relative to a tape edge;

said playback heads are moved relative to said first tape at said predetermined standard track angle and at said speed being n times standard head speed, along said series of tracks on the first recording tape for said reproduction of the information; and said recording heads are moved relative to said second tapes at said predetermined standard track angle standard for said destined standard format, and at said speed being n times standard head speed, for rerecording of said information in slanted tracks for said destined standard format.

40. Records as claimed in claim 38, where in said method:

said predetermined standard number of playback heads is rotated about a first axis at an increased speed of rotation being n times standard head speed;

said first tape is wrapped about a first cylinder having said first axis for movement of said playback heads relative to said first tape in a manner correlated to said standard format;

said first cylinder is provided at a predetermined standard cylinder diameter correlated to the first-mentioned standard format;

said playback heads are rotated about said first axis at said increased speed of rotation being n times standard head speed, while said first tape is advanced about said first cylinder of said standard cylinder diameter at an increased speed being a multiple of standard tape speed for reproducing said information from said first tape;

each set of said predetermined standard number of recording heads is rotated about a second axis at an increased speed of rotation being n times standard head speed;

each of said second tapes is wrapped about a second cylinder having said second axis for movement of said recording heads relative to said second tapes in a manner correlated to said standard format;

said second cylinder is provided at a predetermined standard cylinder diameter correlated to said destined standard format; and said recording heads are rotated about said second axis at said increased speed of rotation being n times standard head speed, while each tape is advanced about a second cylinder of the latter standard cylinder diameter at an increased speed being a multiple of standard tape speed for rerecording said reproduced information onto said tapes in said destined standard format.

41. Records as claimed in claim 40, where in said method:

each standard format is correlated to a standard relative tilt angle of said first and second axes; and said first and second axes are maintained at said standard relative tilt angle during reproduction of said information with the rotated playback heads from said series of tracks on the first recording tape, and during rerecording of said reproduced information with said recording heads onto said second tapes in said destined standard format.

42. Records as claimed in claim 38, where in said method:

said predetermined standard number of playback heads is rotated about a first axis at an increased speed of rotation being n times standard head speed;

said first axis of rotation has a predetermined standard tilt correlated to the first-mentioned standard format;

said first tape is wrapped about a first cylinder having said first axis for movement of said playback heads relative to said first tape in a manner correlated to the first-mentioned standard format;

said playback heads are rotated about said first axis at said increased speed of rotation being n times standard head speed, while said first axis is maintained at said predetermined standard tilt and while said first tape is advanced about said first cylinder at an increased speed being a multiple of standard tape speed for reproducing said information from said first tape;

each set of said predetermined standard number of recording heads is rotated about a second axis at an increased speed of rotation being n times standard head speed;

said second axis of rotation has a predetermined standard tilt correlated to said destined standard format;

each of said second tapes is wrapped about a second cylinder having said second axis for movement of said recording heads relative to said second tapes in a manner correlated to said destined standard format; and said recording heads are rotated about said second axis at said speed of rotation being n times standard head speed, while said second axis is maintained at the latter predetermined standard tilt and while each second tape is advanced about a second cylinder at an increased speed being a multiple of standard tape speed for rerecording said reproduced information onto said second tapes in said destined standard format.

43. Records as claimed in claim 38, where in said method:

said predetermined standard number of playback heads is rotated about a first axis at an increased speed of rotation being n times standard head speed;

said first tape is wrapped about a first cylinder having said first axis for movement of said playback heads relative to said first tape in a manner correlated to the first-mentioned standard format;

said playback heads are rotated about said first axis at said increased speed of rotation being n times standard head speed, while said first tape is advanced about said first cylinder at an increased speed being a multiple of standard tape speed for reproducing said information from said first tape;

said playback heads are maintained axially stationary in either direction of said first axis throughout rotation of said playback heads at said increased speed of rotation being n times standard head speed, for said reproducing of information from said first tape;

each set of said predetermined standard number of recording heads is rotated about a second axis at an increased speed of rotation being n times standard head speed;

each of said second tapes is wrapped about a second cylinder having said second axis for movement of said recording heads relative to said second tapes in a manner correlated to said destined standard format;

said recording heads are rotated about said second axis at said increased speed of rotation being n times standard head speed, while each second tape is advanced about a second cylinder at an increased speed being a multiple of standard tape speed for rerecording said reproduced information onto said second tapes in said destined standard format; and said recording heads are maintained axially stationary in either direction of said second axis throughout rotation of said recording heads at said increased speed of rotation being n times standard head speed, for said rerecording of said reproduced information onto said second tapes in said destined standard format.

44. Records of information on tapes in cassettes for replay by several end users at different times and at a standard speed, with said information having been provided on a recording medium for ultimate playback at a standard speed from a standard format in a series of tracks slanted relative to a direction of movement of the recording medium, said records produced by a method comprising in combination the steps of:

reproducing said information in the form of electric signals seriatim from said recording medium at increased speed on the order of a multiple of said standard speed;

simultaneously rerecording said reproduced information from said electric signals seriatim in said standard format with series of tracks on bulk tape at said increased speed; and subsequently loading at least part of said bulk tape in the form of program-length tape sections having said reproduced information rerecorded thereon into cassettes for replay of said rerecorded information by several end users at different times from the loaded cassettes at standard speed.

45. Records as claimed in claim 44, wherein said method includes the steps of:

loading only part of said bulk tape in the form of said feature-length tape sections having said reproduced information rerecorded thereon into cassettes; and storing the remainder of said bulk tape, having said reproduced information rerecorded thereon, on a standby basis.

46. Records as claimed in claim 45, wherein said method includes the step of:

loading also the remainder of said bulk tape into further cassettes for replay of said recorded information from the further cassettes at standard speed in the form of program-length tape sections having said reproduced information rerecorded thereon.

47. Records as claimed in claim 45, wherein said method includes the step of:

erasing said rerecorded information from said remainder of the bulk tape.

48. Records as claimed in claim 47, wherein said method includes the step of:

recording other information on said remainder of the bulk tape.

49. Records as claimed in claim 44, wherein said method includes the steps of:

meeting further demand for replayable recordings of said information quickly by:

rapidly reproducing said information from said series of tracks on the recording medium in the form of electric signals seriatim at increased speed on the order of a multiple of said standard speed;

simultaneously rerecording said reproduced information from said electric signals seriatim in a standard format with series of tracks on further bulk tape at said increased speed; and subsequently loading at least part of said further bulk tape in the form of program-length tape sections having said reproduced information rerecorded thereon into further cassettes for replay of said rerecorded information by several end users at different times from the further loaded cassettes at standard speed.

50. Records as claimed in claim 44, where in said method:

said standard format is correlated to a predetermined standard number of recording heads for recording information in said series of tracks at said standard speed; and only said predetermined standard number of recording heads is employed per bulk video tape for simultaneously rerecording said reproduced information from said electric signals seriatim in a standard format with series of tracks at said increased speed, said bulk tape being moved at a speed being n times a speed standard for said tape in a standard format and said heads being rotated at a speed being n times a head speed standard for said standard format, with n being a multiple.

51. Records as claimed in claim 50, where in said method:

said standard format is correlated to a predetermined standard track angle of each of said slanted tracks relative to a bulk tape edge; and said recording heads are moved relative to bulk tape at said predetermined standard track angle and at said speed being n times standard head speed, for rerecording of said information in slanted tracks for said standard format.

52. Records as claimed in claim 50, where in said method:

each set of said predetermined standard number of recording heads is rotated about an axis at an increased speed of rotation being n times standard head speed;

each of said tapes is wrapped about a cylinder having said axis for movement of said recording devices heads relative to said tapes in a manner correlated to said standard format;

said cylinder is provided at a predetermined standard cylinder diameter correlated to said standard format; and said recording heads are rotated about said axis at said increased speed of rotation being n times standard head speed, while each tape is advanced about said cylinder of said standard cylinder diameter at an increased speed being n times a speed standard for said bulk tape in said standard format, for rerecording said reproduced information onto said tapes in said standard format.

53. Records as claimed in claim 52, where in said method:

said standard format is correlated to a standard relative tilt angle of said axis; and said axis is maintained at said standard relative tilt angle during rerecording of said reproduced information onto bulk tape in said standard format.

54. Records as claimed in claim 50, where in said method:

each set of said predetermined standard number of recording heads is rotated about an axis at an increased speed of rotation being n times standard head speed;

said axis of rotation has a predetermined standard tilt correlated to said standard format;

each bulk tape is wrapped about a cylinder having said axis for movement of said recording heads relative to that bulk tape in a manner correlated to said standard format; and said recording heads are rotated about said axis at said increased speed of rotation being n times standard head speed while said axis is maintained at said predetermined standard tilt and while the bulk tape is advanced about said cylinder at an increased speed being n times a speed standard for said tapes in said standard format for rerecording said reproduced information in said standard format.

55. Records as claimed in claim 50, where in said method:
- each set of said predetermined standard number of recording heads is rotated about an axis at an increased speed of rotation being n times standard head speed;
- each bulk tape is wrapped about a cylinder having said axis for movement of said recording heads relative to that bulk tape in a manner correlated to said standard format;
- said recording heads are rotated about said axis at said increased speed of rotation being n times standard head speed, while the bulk tape is advanced about said cylinder at an increased speed being n times a speed standard for said bulk tape in said standard format, for rerecording said reproduced information in said standard format; and
- said recording heads are maintained axially stationary in either direction of said axis throughout rotation of said recording heads at said increased speed of rotation being n times standard head speed, for said rerecording of said reproduced information in said standard format.

56. Records as claimed in claim 44, where in said method:
- said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback devices;
- only said predetermined standard number of playback heads are employed for reproducing said information from said series of tracks on the first recording tape in the form of electric signals seriatim by moving said first tape at a speed being n times a speed standard for said first tape in said standard format and moving said playback heads relative to said moving first tape at a speed being n times a head speed standard for said standard format; and
- only said predetermined standard number of recording heads are employed per bulk video tape for simultaneously rerecording said reproduced information from said electric signals seriatim in a standard format with series of tracks by moving the bulk tape at a speed being n times a speed standard for said bulk tape in said standard format and moving said recording heads relative to the moving bulk tape at a speed being n times the head speed standard for said standard format, with n being a multiple.

57. Records of information fixed in tangible media for replay by several end users at different times and at a standard speed, produced by a method comprising in combination the steps of:
- providing a first recording medium having said information recorded thereon at said standard speed with the aid of first synchronization signals having standard synchronization frequencies;
- synchronization second synchronization signals having increased frequencies on the order of a multiple of said standard synchronization frequencies;
- reproducing said recorded information from said first recording medium in the form of electric signals at increased speed corresponding to said increased synchronization frequencies;
- processing said reproduced information in the form of said electric signals with said second synchronization signals having said increased frequencies;
- deriving from said second synchronization signals having said increased frequencies third synchronization signals having said standard synchronization frequencies;
- simultaneously rerecording said reproduced information from said processed electric signals on several second recording media at said increased speed to provide said records; and
- synchronizing said reproduction and rerecording with said third synchronization signals.

58. Records as claimed in claim 57, wherein said method includes the steps of:
- providing servo systems for synchronizing said reproduction and rerecording; and
- effecting synchronization of said reproduction and rerecording with said servo systems in response to said third synchronization signals.

59. Records as claimed in claim 58, wherein said method includes the steps of:
- providing rotary components for effecting said reproduction and rerecording;
- generating tachometer signals in response to operation of said rotary components;
- diminishing a rate of said tachometer signals by a divisor corresponding to said multiple;
- providing servo systems for synchronizing said reproduction and rerecording; and
- effecting synchronization of said reproduction and rerecording with said servo systems in response to the tachometer signals at said diminished rate and in response to said third synchronization signals.

60. Records as claimed in claim 57, wherein, as to said method:
- said first recording medium is a first tape having said information stored thereon;
- said second recording media comprise second tapes for receiving said information;
- said reproducing of information includes moving said first tape and moving reproducing means relative to said moving first tape for reproducing said information in the form of said electric signals;
- said rerecording of reproduced information includes moving said second tapes and moving recording means relative to said moving second tapes for simultaneously rerecording said reproduced information from said electric signals onto said second tapes; and
- said synchronization includes synchronizing with said third signals said moving reproducing means relative to said moving first tape and said moving recording means relative to said moving second tapes.

61. In apparatus for transmitting information from producer to end users without deliberate omission of information tracks, wherein said information is provided on a first recording medium for ultimate playback at a standard speed from a standard format in a series of tracks slanted relative to a direction of movement of the recording medium, with a predetermined standard number of playback heads correlated to said standard format, the improvement comprising in combination:

playback equipment for reproducing said information in the form of electric signals seriatim from said first recording medium at increased speed on the order of a multiple, n, of said standard speed; and rerecording equipment connected to said playback equipment for simultaneously rerecording said reproduced information from said electric signals seriatim in said standard format with series of tracks on several second recording media with recording heads of only said predetermined standard number for each of said second recording media, for replay of said rerecorded information by several end users at different times with said predetermined standard number of playback heads from said several recording media at standard speed, said recording equipment including means for moving said second recording media at a speed being n times a speed being standard for said second recording media in said standard format, and for moving said recording heads at a speed being n times a head speed standard for said standard format.

62. Apparatus as claimed in claim 61, wherein:
said rerecording equipment includes means for rerecording said reproduced information on moving tapes as said second recording media and for moving said recording heads relative to said moving tapes for simultaneously rerecording said reproduced information from said electric signals with sets of only said predetermined standard number of recording heads but at said speed being n times standard head speed onto said tapes moves at n times a speed standard for said tapes in said standard format.

63. Apparatus as claimed in claim 62, wherein:
said rerecording equipment includes means for moving said recording heads relative to said tapes at a predetermined standard track angle correlated to said standard format for said slanted tracks relative to a tape edge and at said speed being n times a standard head speed for rerecording of said information in slanted tracks for said standard format.

64. Apparatus as claimed in claim 62, wherein:
said rerecording equipment includes means for rotating each set of said predetermined standard number of recording heads about an axis at an increased speed of rotation being n times standard head speed and for each of said tapes a scanner cylinder having said axis for movement of said recording heads relative to said tapes in a manner correlated to said standard format and having a predetermined standard cylinder diameter correlated to said standard format.

65. Apparatus as claimed in claim 64, wherein:
said rerecording equipment includes means for maintaining said axis at a standard relative tilt angle correlated to said standard format during rerecording of said reproduced information onto said tapes in said standard format.

66. Apparatus as claimed in claim 62, wherein:
said rerecording equipment includes means for rotating each set of said predetermined standard number of recording heads at an increased speed of rotation being n times standard head speed and about and axis of rotation having a predetermined standard tilt correlated to said standard format, and for each of said tapes a scanner cylinder having said axis for movement of said recording heads relative to said tapes in a manner correlated to said standard format.

67. Apparatus as claimed in claim 62, wherein:
said rerecording equipment includes means for rotating each set of said predetermined standard number of recording heads about an axis at an increased speed of rotation being n times standard head speed, and for each of said tapes a scanner cylinder having said axis for movement of said recording heads relative to said tapes in a manner correlated to said standard format, and means for maintaining said recording heads axially stationary in either direction of said axis throughout rotation of said recording heads at said increased speed of rotation being n times standard head speed for said rerecording of said reproduced information onto said tapes in said standard format.

68. In apparatus for transmitting information from producer to end users wherein said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, the improvement comprising in combination:

playback equiment for reproducing said information from said series of tracks on the first recording tape with only said predetermined standard number of playback heads in the form of electric signals seriatim, including means for moving said first tape at a speed being a multiple, n, of a standard tape speed and moving said playback heads relative to said moving first tape at a speed being n times a standard head speed; and rerecording equipment connected to said playback equipment for simultaneously rerecording said reproduced information from said electric signals seriatim in a standard format, destined for playback at end users, with series of tracks on several second recording tapes with recording heads of only the predetermined number which is standard for said destined standard format for each of said second recording tapes, including means for moving said second tapes at a speed being a multiple, n, of a standard tape speed and moving said recording heads relative to said moving tapes at said speed being n times a standard head speed, for replay of said rerecorded information by several end users at different times from said several recording tapes at standard speed.

69. Apparatus as claimed in claim 68, wherein:
said playback equipment includes means for moving said playback heads relative to said first tape at said speed being n times standard head speed at a predetermined standard track angle correlated to the first-mentioned standard format for the slanted tracks relative to a tape edge; and said rerecording equipment includes means for moving said recording heads relative to said second tapes at a predetermined standard track angle standard for said destined standard format, and at said speed being n times standard head speed for rerecording of said information in slanted tracks for said destined standard format.

70. Apparatus as claimed in claim 68, wherein:
said playback equipment includes means for rotating said predetermined standard number of playback heads about a first axis at an increased speed of rotation being n times standard head speed, and a first scanning cylinder for said first tape having said first axis for movement of said playback heads relative to said first tape in a manner correlated to said standard format, and having a predetermined standard cylinder diameter correlated to the first-mentioned standard format; and
said rerecording equipment includes means for rotating each set of said predetermined standard number of recording heads about a second axis at an increased speed of rotation being n times standard head speed, and for each of said second tapes a second scanner cylinder having said second axis for movement of said recording heads relative to said second tapes in a manner correlated to said standard format, and having a predetermined standard cylinder diameter correlated to said destined standard format.

71. Apparatus as claimed in claim 70, wherein:
said playback equipment and said rerecording equipment each include means for maintaining said first and second axes stationary at a standard relative tilt angle correlated to each standard format during reproduction of said information with the rotated playback heads from said series of tracks on the first recording tape, and during rerecording of said reproduced information with said recording heads onto said second tapes in said destined standard format.

72. Apparatus as claimed in claim 68, wherein:
said playback equipment includes means for rotating said predetermined standard number of playback heads at an increased speed of rotation being n times standard head speed for the first-mentioned standard speed about a first axis of rotation having a predetermined standard tilt correlated to the first-mentioned standard format, and a first scanner cylinder having said first axis for movement of said playback heads relative to said first tape in a manner correlated to the first-mentioned standard format; and
said rerecording equipment includes means for rotating each set of said predetermined standard number of recording heads at an increased speed of rotation being n times standard head speed about a second axis of rotation having a predetermined standard tilt correlated to said destined standard format and for each of said second tapes a second scanner cylinder having said second axis for movement of said recording heads relative to said second tapes in a manner correlated to said destined standard format.

73. Apparatus as claimed in claim 68, wherein:
said playback equipment includes means for rotating said predetermined standard number of playback heads about a first axis at an increased speed of rotation being n times standard head speed, means for maintaining said playback heads axially stationary in either direction of said first axis throughout rotation of said playback heads at said increased speed of rotation for said reproducing of information from said first tape, and a first scanner cylinder having said first axis for movement of said playback heads relative to said first tape in a manner correlated to the first-mentioned standard format; and
said recording equipment includes means for rotating each set of said predetermined standard number of recording heads about a second axis at an increased speed of rotation being n times standard head speed, means for maintaining said recording heads axially stationary in either direction of said second axis throughout rotation of said recording heads at said increased speed of rotation for said rerecording of said reproduced information onto said second tapes in said destined standard format, and for each of said second tapes a second scanner cylinder having said second axis for movement of said recording heads relative to said second tapes in a manner correlated to said destined standard format.

74. In apparatus for transmitting information from producer to end users without deliberate omission of information tracks, wherein said information is provided on a recording medium for ultimate playback at a standard speed from a standard format in a series of tracks slanted relative to a direction of movement of the recording medium, the improvement comprising in combination:
playback equipment for reproducing said information in the form of electric signals seriatim from said recording medium at increased speed on the order of a multiple of said standard speed;
rerecording equipment connected to said playback equipment for simultaneously rerecording said reproduced information from said electric signals seriatim in said standard format with series of tracks on bulk tape at said increased speed; and
means for loading at least part of said bulk tape in the form of program-length tape sections having said reproduced information rerecorded thereon into cassettes for replay of said rerecorded information by several end users at different times from the loaded cassettes at standard speed.

75. Apparatus as claimed in claim 74, including:
means for storing part of said bulk tape, having said reproduced information rerecorded thereon, on a standby basis.

76. Apparatus as claimed in claim 75, including:
means for erasing said rerecorded information from the stored bulk tape.

77. Apparatus as claimed in claim 74, wherein:
said standard format is correlated to a predetermined standard number of recording heads for recording information in said series of tracks at said standard speed; and
said recording equipment includes means for rerecording said reproduced information from said electric signals seriatim in a standard format with series of tracks at said increased speed but only with said predetermined standard number of recording heads per bulk video tape.

78. Apparatus as claimed in claim 77, wherein:
said rerecording equipment includes means for moving said recording heads relative to said tapes at a predetermined standard track angle correlated to said standard format for said slanted tracks relative to a tape edge and at said increased speed for rerecording of said information in slanted tracks for said standard format.

79. Apparatus as claimed in claim 77, wherein:

said rerecording equipment includes means for rotating each set of said predetermined standard number of recording heads about an axis at an increased speed of rotation corresponding to said multiple of said standard speed and for each of said tapes a scanner cylinder having said axis for movement of said recording heads relative to said tapes in a manner correlated to said standard format and having a predetermined standard cylinder diameter correlated to said standard format.

80. Apparatus as claimed in claim 79, wherein:
said rerecording equipment includes means for maintaining said axis at a standard relative tilt angle correlated to said standard format during rerecording of said reproduced information onto said tapes in said standard format.

81. Apparatus as claimed in claim 77, wherein:
said rerecording equipment includes means for rotating each set of said predetermined standard number of recording heads at an increased speed of rotation corresponding to said multiple of said standard speed and about an axis of rotation having a predetermined standard tilt correlated to said standard format, and for each of said tapes a scanner cylinder having said axis for movement of said recording heads relative to said tapes in a manner correlated to said standard format.

82. Apparatus as claimed in claim 77, wherein:
said rerecording equipment includes means for rotating each set of said predetermined standard number of recording heads about an axis at an increased speed of rotation corresponding to said multiple of said standard speed, and for each of said tapes a scanner cylinder having said axis for movement of said recording heads relative to said tapes in a manner correlated to said standard format, and means for maintaining said recording heads axially stationary in either direction of said axis throughout rotation of said recording heads at said increased speed of rotation for said rerecording of said reproduced information onto said tapes in said standard format.

83. Apparatus as claimed in claim 74, wherein:
said playback equipment includes means for receiving said information on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, and means for reproducing said information from said series of tracks on the first recording tape in the form of electric signals seriatim with only said predetermined standard number of playback heads moving relative to said first tape at increased speed on the order of a multiple of said standard speed; and
said rerecording equipment includes means for rerecording said reproduced information from said electric signals seriatim in a standard format with series of tracks with recording heads of only said predetermined standard number per bulk video tape moving relative to the bulk tape at said increased speed.

84. In apparatus for duplicating information recorded on a first recording medium at standard speed with the aid of first synchronization signals having standard synchronization frequencies, the improvement comprising in combination:
means for generating second synchronization signals having increased frequencies on the order of a multiple of said standard synchronization frequencies;
means for reproducing said recorded information from said first recording medium in the form of electric signals at increased speed corresponding to said increased synchronization frequencies;
means connected to said means for providing second synchronization signals and to said reproducing means for processing said reproduced information from said processed electric signals with said second synchronization signals having said increased frequencies;
means connected to said reproducing means for simultaneously rerecording said reproduced information in the form of said processed electric signals on several second recording media at said increased speed, for replay of said rerecorded information by several users at different times from said several recording media at said standard speed;
means connected to said means for providing second synchronization signals for deriving from said synchronization signals having said increased frequencies third synchronization signals having said standard synchronization frequencies; and
means connected to said reproducing means and to said rerecording means, and to said deriving means, for synchronizing said reproducing and rerecording with said third synchronization signals.

85. Apparatus as claimed in claim 84, wherein said synchronizing means include:
servo systems for synchronizing said reproduction and rerecording; and
means connected to said servo systems for effecting synchronization of said reproduction and rerecording in response to said third synchronization signals.

86. Apparatus as claimed in claim 84, wherein:
said reproducing means and said rerecording means include rotary components for effecting said reproduction and rerecording;
said apparatus includes:
means for generating tachometer signals in response to operation of said rotary components; and
means connected to said generating means for diminishing a rate of said tachometer signals by a divisor corresponding to said multiple; and
said synchronizing means include:
servo systems for synchronizing said reproduction and rerecording; and
means connected to said servo systems for effecting synchronization of said reproduction and rerecording in response to the tachometer signals at said diminished rate and in response to said third synchronization signals.

87. Apparatus as claimed in claim 84, wherein:
said reproducing means include reproducing devices for reproducing said information in the form of said electric signals from said first recording medium in the form of a first tape having said information stored thereon, and means for moving said first tape and moving said reproducing devices relative to said moving first tape; and said rerecording means include recording devices for rerecording said reproduced information from said electric signals onto said second recording media in the form of second tapes for receiving said information, and means for moving said second tapes and moving said recording devices relative to said moving second tapes.

* * * * *

REEXAMINATION CERTIFICATE (2425th)
United States Patent [19]
Warren et al.

[11] B1 5,065,258
[45] Certificate Issued Nov. 8, 1994

[54] TRANSMITTING INFORMATION FROM PRODUCER TO END USERS THROUGH SLANT-TRACK TAPE-TO-TAPE COPYING AT HIGHER-THAN-STANDARD SIGNAL TRANSMISSION

[75] Inventors: Eugene D. Warren, Long Beach; Robert B. Pfannkuch, Manhattan Beach; William C. Laumeister, San Jose; Louis L. Pourciau, Portola Valley, all of Calif.

[73] Assignee: Rank Video Services America, Northbrook, Ill.

Reexamination Request:
No. 90/003,021, Apr. 6, 1993

Reexamination Certificate for:
Patent No.: 5,065,258
Issued: Nov. 12, 1991
Appl. No.: 248,401
Filed: Sep. 23, 1988

Related U.S. Application Data

[63] Continuation-in-part of Ser. No. 906,822, Sep. 12, 1986, abandoned.

[51] Int. Cl.[5] .............................................. G11B 5/86
[52] U.S. Cl. ......................................................... 360/15
[58] Field of Search .................. 360/8, 9.1, 10.3, 13, 360/14.1, 15, 33.1, 37.1; 358/86, 335, 134; 242/56 R; 455/3

[56] References Cited

U.S. PATENT DOCUMENTS

| | | |
|---|---|---|
| 1,116,949 | 11/1914 | Stille . |
| 3,027,425 | 3/1962 | Tannenbaum et al. . |
| 3,564,141 | 2/1971 | Hurst . |
| 3,592,977 | 7/1971 | Lemke ................... 360/16 |
| 3,714,377 | 1/1973 | Moretti . |
| 3,781,479 | 12/1973 | Swoboda . |
| 3,864,732 | 2/1975 | Grindley et al. ............ 360/15 |
| 3,893,169 | 7/1975 | Hall, Jr. ..................... 360/37.1 |
| 4,061,286 | 12/1977 | King, Sr. et al. ............ 242/56 R |
| 4,108,365 | 8/1978 | Hughes ....................... 360/15 X |
| 4,167,023 | 9/1979 | Bessette et al. ............ 360/9.1 X |
| 4,355,338 | 10/1982 | Yamamoto et al. ......... 360/15 |
| 4,393,415 | 7/1983 | Hurst ........................... 360/9.1 |
| 4,404,602 | 9/1983 | Hoshimi et al. ............ 360/13 |
| 4,410,917 | 10/1983 | Newdoll et al. ............. 360/15 |
| 4,496,997 | 1/1985 | Ohtsuki ...................... 360/13 |
| 4,506,387 | 3/1985 | Walter ........................ 358/86 X |
| 4,512,527 | 4/1985 | Rehklau et al. ............ 242/56 R |
| 4,558,376 | 12/1985 | Heitmann ................... 360/10.1 |
| 4,584,613 | 4/1986 | Amari et al. ................ 360/10.3 |
| 4,611,252 | 9/1986 | Igata et al. .................. 360/10.3 |
| 4,866,543 | 9/1989 | Cooper et al. .............. 360/15 |
| 5,148,403 | 9/1992 | Gardner ...................... 360/15 |

FOREIGN PATENT DOCUMENTS

| | | |
|---|---|---|
| 0105828 | 8/1980 | Japan . |
| 0105829 | 8/1980 | Japan . |
| 0007242 | 1/1981 | Japan . |
| 0003229 | 1/1982 | Japan . |
| 6349953 | 11/1982 | Japan . |
| 0203232 | 12/1982 | Japan . |
| 0139339 | 8/1983 | Japan . |
| 0143410 | 8/1983 | Japan . |
| 0246925 | 11/1986 | Japan . |

OTHER PUBLICATIONS

Lenk, "Complete Guide to Videocassette Recorder operation and Servicing", 1983 pp. 24–25.
Graham, "Holy backlog! 'Batman' will be late on tape", USA Today, Oct. 23, 1989.

*Primary Examiner*—Andrew L. Sniezek

[57] ABSTRACT

In a method and apparatus for transmitting information from producer to end viewers, the information is provided on a first recording medium recorded at a standard speed and in a standard format in a series of tracks slanted relative to a direction of movement of that medium. The information is reproduced from the series of tracks on the first recording medium in the form of electric signals seriatim at increased speed on the order of a multiple of the standard speed. The reproduced information is simultaneously rerecorded from the electric signals seriatim in a standard format with series of tracks on several second recording media at the increased speed, for replay of that recorded information by several end users at different times from the several recording media at standard speed. Additionally or alternatively, second synchronization signals having frequencies increased by the above mentioned multiple relative to a standard synchronization frequencies may be provided, and the electric signals may be processed with those second synchronization signals. From these second synchronization signals, third synchronization signals having the standard frequencies may be derived for synchronizing the above mentioned reproduction and rerecording processes.

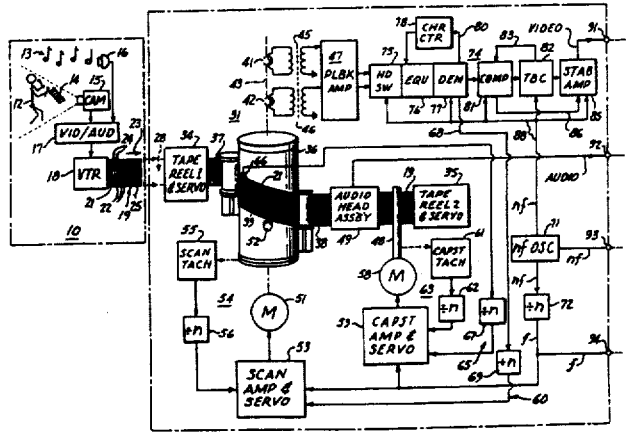

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 7 lines 38–66:

From one aspect thereof, the invention resides in methods and apparatus for transmitting information from producer to end users without deliberate omission of information tracks, wherein the information is provided on a first recording medium for ultimate playback at a standard speed from a standard format in a series of tracks slanted relative to a direction of movement of the recording medium with a predetermined standard number of playback devices or heads correlated to that standard format. The invention according to this aspect resides in the improvement comprising in combination the steps of, or means for, reproducing *and demodulating* the information in the form of electric signals seriatim from the first recording medium at increased speed on the order of a multiple, n, of the standard speed, and simultaneously *remodulating and* rerecording that reproduced information from those electric signals seriatim in the standard format with series of tracks on several second recording media at the increased speed with recording devices or heads of only the predetermined standard number for each of the second recording media, the second recording media being moved at a speed being n times a speed standard for said second recording media in said standard format and said heads being rotated at a speed being n times a head speed standard for that standard format, for replay of that recorded information by several end users at different times with the predetermined standard number of playback devices or heads from the several recording media at standard speed.

AS A RESULT OF REEXAMINATION, IT HAS BEEN DETERMINED THAT:

The patentability of claims 14–30, 44–60 and 74–87 is confirmed.

Claims 1, 8, 31, 38, 61 and 68 are determined to be patentable as amended.

Claims 2–7, 9–13, 32–37, 39–43, 62–67 and 69–73, dependent on an amended claim, are determined to be patentable.

1. In a method of transmitting information from producer to end users without deliberate omission of information tracks, wherein said information is provided on a first recording medium for ultimate playback at a standard speed from a standard format in a series of tracks slanted relative to a direction of movement of the recording medium, with a predetermined standard number of playback heads correlated to said standard format, the improvement comprising in combination the steps of:

reproducing *and demodulating* said information in the form of electric signals seriatim from said first recording medium at increased speed on the order of a multiple, n, of said standard speed; and simultaneously *remodulating and* rerecording said reproduced information from said electric signals seriatim in said standard format with series of tracks on several second recording media at said increased speed with recording heads of only said predetermined standard number for each of said second recording media, said second recording media being moved at a speed being n times a speed standard for said second recording media in said standard format and said heads being rotated at a speed being n times a head speed standard for said standard format, for replay of said rerecorded information by several end users at different times with said predetermined standard number of playback heads from said several recording media at standard speed.

8. In a method of transmitting information from producer to end users wherein said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, the improvement comprising in combination the steps of:

reproducing said information from said series of tracks on the first recording tape with only said predetermined standard number of playback heads in the form of electric signals seriatim by moving said first tape at a speed being a multiple, n, of a standard tape speed, and moving said playback heads relative to said moving first tape at a speed being n times a standard head speed; [and]

*demodulating said reproduced information; and* simultaneously *remodulating and* rerecording said reproduced information from said electric signals seriatim in a standard format, destined for playback at end users, with series of tracks on several second recording tapes with recording heads of only the predetermined number which is standard for said destined standard format for each of said second recording tapes, by moving said second tapes at a speed being a multiple, n, of a standard tape speed, and moving said recording heads relative to said moving second tapes at an increased speed being n times a standard head speed, for replay of said rerecorded information by several end users at different times from said several recording tapes at standard speed.

31. Records of information fixed in tangible media for replay by several end users at different times and at a standard speed, with said information having been provided on a first recording medium for ultimate playback at a standard speed from a standard format in a series of tracks slanted relative to a direction of movement of the recording medium, with a predetermined standard number of playback heads correlated to said standard format, said records produced by a method comprising in combination the steps of:

reproducing *and demodulating* said information in the form of electric signals seriatim from said first recording medium at increased speed on the order of a multiple, n, of said standard speed; and simultaneously *remodulating and* rerecording said reproduced information from said electric signals seriatim in said standard format with series of tracks on several second recording media at said increased speed with recording heads of only said predetermined standard number for each of said second recording media, said second recording media being moved at a speed being n times a speed standard for said second recording media in said standard format and said heads being rotated at a speed being n times a head speed standard for said standard format, for replay of said rerecorded information by several end users at different times with said predetermined standard number of playback heads from said several recording media at standard speed.

38. Records of information fixed in tangible media for replay by several end users at different times and at a standard speed, with said information having been provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, said records produced by a method comprising in combination the steps of:

reproducing said information from said series of tracks on the first recording tape with only said predetermined standard number of playback heads in the form of electric signals seriatim by moving said first tape at a speed being a multiple, n, of a standard tape speed, and moving said playback heads relative to said moving first tape at a speed being n times a standard head speed; [and]

*demodulating said reproduced information; and* simultaneously *remodulating and* rerecording said reproduced information from said electric signals seriatim in a standard format, destined for playback at end users, with series of tracks on several second recording tapes with recording heads of only the predetermined number which is standard for said destined standard format for each of said second recording tapes, by moving said second tapes at a speed being a multiple, n, of a standard tape speed, and moving said recording heads relative to said moving second tapes at an increased speed being n times a standard head speed, for replay of said rerecorded information by several end users at different times from said several recording tapes at standard speed.

61. In apparatus for transmitting information from producer to end users without deliberate omission of information tracks, wherein said information is provided on a first recording medium for ultimate playback at a standard speed from a standard format in a series of tracks slanted relative to a direction of movement of the recording medium, with a predetermined standard number of playback heads correlated to said standard format, the improvement comprising in combination:

playback *and demodulating* equipment for reproducing said information in the form of electric signals seriatim from said first recording medium at increased speed on the order of a multiple, n, of said standard speed; [and]

*remodulating and* rerecording equipment connected to said playback equipment for simultaneously rerecording said reproduced information from said electric signals seriatim in said standard format with series of tracks on several second recording media with recording heads of only said predetermined standard number for each of said second recording media, for replay of said rerecorded information by several end users at different times with said predetermined standard number of playback heads from said several recording media at standard speed, said recording equipment including means for moving said second recording media at a speed being n times a speed being standard for said second recording media in said standard format, and for moving said recording heads at a speed being n times a head speed standard for said standard format.

68. In apparatus for transmitting information from producer to end users wherein said information is provided on a first recording tape recorded in a series of tracks slanted relative to a direction of movement of the first recording tape in a standard format correlated to a predetermined standard number of playback heads for reproducing said information from said series of tracks and correlated to a standard speed for reproducing said information from said series of tracks on said first recording tape with said predetermined standard number of playback heads, the improvement comprising in combination:

playback equipment for reproducing said information from said series of tracks on the first recording tape with only said predetermined standard number of playback heads in the form of electric signals seriatim, including means for moving said first tape at a speed being a multiple, n, of a standard tape speed and moving said playback heads relative to said moving first tape at a speed being n times a standard head speed; [and]

*said playback equipment including means for demodulating said reproduced information; and*

*remodulating and* rerecording equipment connected to said playback equipment for simultaneously rerecording said reproduced information from said electric signals seriatim in a standard format, destined for playback at end users, with series of tracks on several second recording tapes with recording heads of only the predetermined number which is standard for said destined standard format for each of said second recording tapes, including means for moving said second tapes at a speed being a multiple, n, of a standard tape speed and moving said recording heads relative to said moving tapes at said speed being n times a standard head speed, for replay of said rerecorded information by several end users at different times from said several recording tapes at standard speed.

\* \* \* \* \*